US010813486B2

(12) United States Patent
Conti et al.

(10) Patent No.: US 10,813,486 B2
(45) Date of Patent: Oct. 27, 2020

(54) AUTOMATIC AND ADJUSTABLE SPIRALIZER APPARATUS

(71) Applicant: WHIRLPOOL CORPORATION, Benton Harbor, MI (US)

(72) Inventors: Michael P. Conti, St. Joseph, MI (US); Mansour Ourasanah, Chicago, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 371 days.

(21) Appl. No.: 15/749,674

(22) PCT Filed: Nov. 11, 2016

(86) PCT No.: PCT/US2016/061527
§ 371 (c)(1),
(2) Date: Feb. 1, 2018

(87) PCT Pub. No.: WO2017/083646
PCT Pub. Date: May 18, 2017

(65) Prior Publication Data
US 2018/0220828 A1    Aug. 9, 2018

Related U.S. Application Data

(60) Provisional application No. 62/253,938, filed on Nov. 11, 2015.

(51) Int. Cl.
*A47J 17/16*      (2006.01)
*B26D 3/26*       (2006.01)
(Continued)

(52) U.S. Cl.
CPC .............. *A47J 17/16* (2013.01); *A47J 43/04* (2013.01); *A47J 43/08* (2013.01); *B26D 1/0006* (2013.01);
(Continued)

(58) Field of Classification Search
CPC . A47J 17/16; A47J 43/04; A47J 43/08; B26D 7/2614; B26D 3/11; B26D 1/0006; B26D 3/26
See application file for complete search history.

(56) References Cited

U.S. PATENT DOCUMENTS 2,526,029 A * 10/1950 Judelson .............. B26D 7/2614
242/525.1
3,153,436 A * 10/1964 Chesley .................. B26D 3/11
99/538
(Continued)

FOREIGN PATENT DOCUMENTS

KR     10-0853010 B1    8/2008
RU        2060721 C1    5/1996

*Primary Examiner* — Rick K Chang
(74) *Attorney, Agent, or Firm* — Price Heneveld LLP

(57) ABSTRACT

A food processing device includes a base portion with a motor housing upwardly extending from a first end of the base portion. A motor is disposed within the motor housing. A processing assembly extends upwardly from a second end of the base portion and is spaced-apart from the motor housing to define a processing area therebetween. An auger assembly includes an auger shaft that is operably coupled to the motor for driving rotational movement of the auger shaft. A clutch assembly is disposed within the motor housing and is operable between engaged and disengaged positions with the auger assembly. A disconnect feature is disposed on the motor housing and configured to selectively actuate movement of the clutch assembly between engaged and disengaged positions with the auger assembly. In use, a food substrate is mounted to the processing accessory and the auger shaft to process the food substrate.

15 Claims, 21 Drawing Sheets

(51) Int. Cl.
*A47J 43/04* (2006.01)
*A47J 43/08* (2006.01)
*B26D 1/00* (2006.01)
*B26D 3/11* (2006.01)
*B26D 7/26* (2006.01)

(52) U.S. Cl.
CPC ............... *B26D 3/11* (2013.01); *B26D 3/26* (2013.01); *B26D 7/2614* (2013.01)

(56) References Cited

U.S. PATENT DOCUMENTS

| | | | |
|---|---|---|---|
| 3,211,202 A * | 10/1965 | Mason | B26D 3/185 |
| | | | 99/592 |
| RE26,684 E | 10/1969 | Mason | |
| 4,412,483 A * | 11/1983 | Hoegh | B26D 3/11 |
| | | | 99/537 |
| 4,628,808 A | 12/1986 | Simon | |
| 5,138,940 A | 8/1992 | Geissler et al. | |
| RE35,374 E * | 11/1996 | Logan, Jr. | B26D 1/16 |
| | | | 426/641 |
| 6,053,098 A | 4/2000 | Yamamoto | |
| 6,866,878 B1 | 3/2005 | Battaglia | |
| 10,010,209 B2 * | 7/2018 | Tuchrelo | B26D 3/282 |
| 2012/0090480 A1 | 4/2012 | Caspar et al. | |
| 2012/0210836 A1 * | 8/2012 | Wiggins | B26D 1/0006 |
| | | | 83/13 |
| 2018/0178403 A1 * | 6/2018 | Vivirito | B26D 7/225 |

* cited by examiner

AUTOMATIC AND ADJUSTABLE SPIRALIZER APPARATUS

BACKGROUND

The present concept generally relates to a food processing apparatus, and more particularly, to a food processing apparatus which is configured to peel, slice, core and spiralize various food substrates, wherein the apparatus includes a number of adjustable and conveniently removeably features.

SUMMARY

One aspect of the present concept includes a food processing device having a base portion with a motor housing upwardly extending from a first end of the base portion. A motor is disposed within the motor housing. A processing assembly extends upwardly from a second end of the base portion and is spaced-apart from the motor housing to define a processing area therebetween. An auger assembly includes an auger shaft that is operably coupled to the motor for driving rotational movement of the auger shaft. A clutch assembly is disposed within the motor housing and is operable between engaged and disengaged positions with the auger assembly. A disconnect feature is disposed on the motor housing and configured to selectively actuate movement of the clutch assembly between engaged and disengaged positions with the auger assembly.

Another aspect of the present concept includes a food processing device having a base portion with a motor housing upwardly extending from the base portion. A processing assembly is removeably mounted to the base portion and is spaced-apart from the motor housing to define a processing area therebetween. An auger assembly is operably coupled to a motor within the motor housing. A clutch assembly is operable between engaged and disengaged positions with the auger assembly within the motor housing. A clutch disengagement lever is operably coupled to the clutch assembly for selectively actuating movement of the clutch assembly between the engaged and disengaged positions.

Yet, another aspect of the present concept includes a food processing device having a base portion with a motor housing upwardly extending from the base portion. A drip tray assembly is removeably mounted to the base portion. A processing assembly is removeably mounted to the drip tray assembly and is spaced-apart from the motor housing to define a processing area therebetween. A peeler assembly is removeably coupled to the drip tray assembly within the processing area. An auger assembly is operably coupled to a motor within the motor housing for rotating the auger assembly. The auger assembly includes an engagement plate. The processing assembly and the engagement plate are configured to mount a food substrate therebetween.

These and other features, advantages, and objects of the present device will be further understood and appreciated by those skilled in the art upon studying the following specification, claims, and appended drawings.

DETAILED DESCRIPTION OF EMBODIMENTS

Figure 1A:
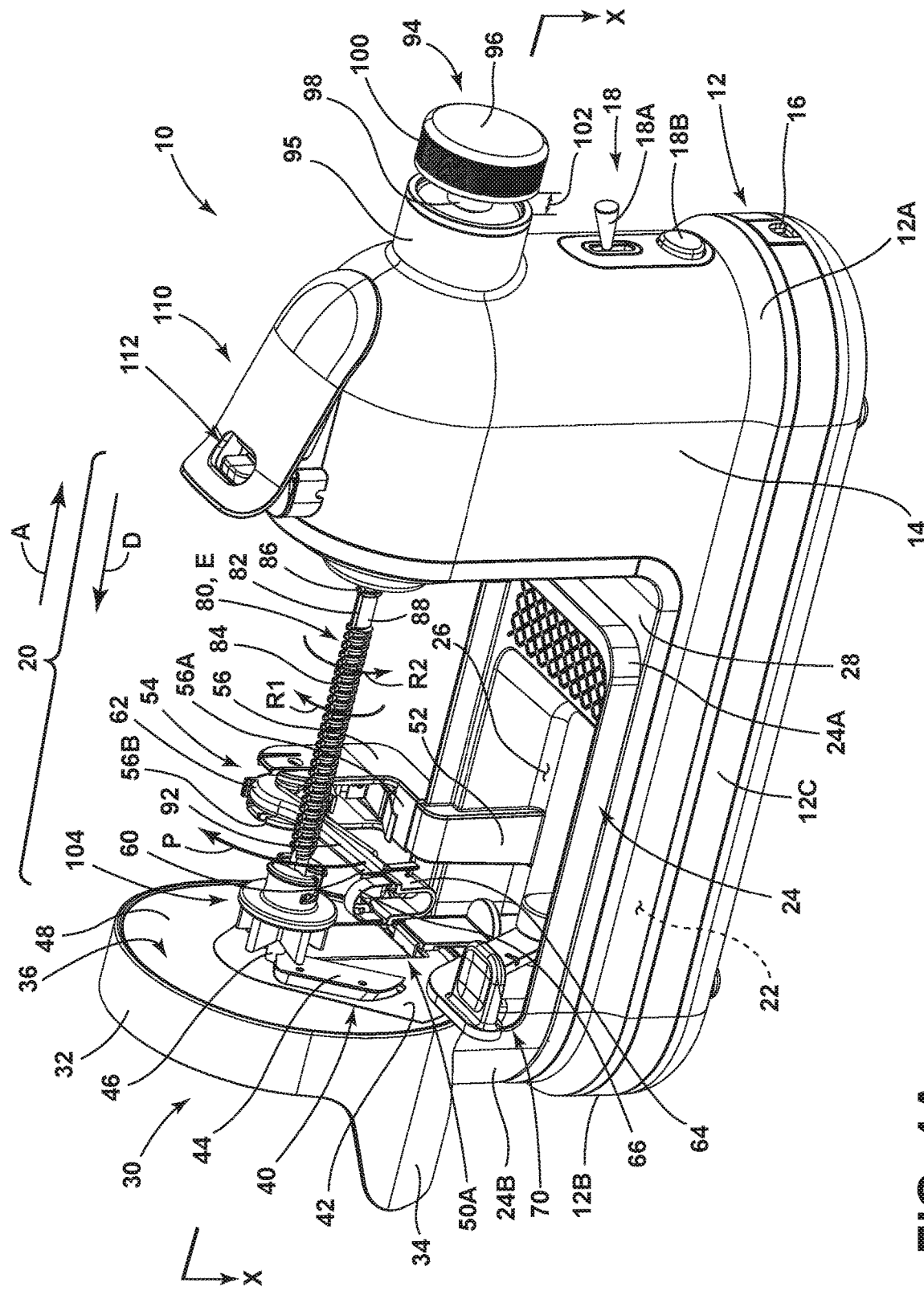
FIG. 1A is a front perspective view of a food processing device according to one embodiment of the present concept.

For purposes of description herein the terms "upper," "lower," "right," "left," "rear," "front," "vertical," "horizontal," and derivatives thereof shall relate to the device as oriented in FIG. 1A. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1A, the reference numeral 10 generally designates a food processing device of the present concept. The food processing device 10 is configured to be supported in an upright position by a base portion 12, as shown in FIG. 1, on a substantially flat support surface, such as a countertop surface. The base portion 12 includes first and second ends 12A, 12B. A motor housing 14 upwardly extends from the first end 12A of the base portion 12. The motor housing 14 houses a motor assembly 210 (FIG. 10) which is configured to power the food processing features of the food processing device 10, as further described below. As further shown in FIG. 1, a power inlet 16 is disposed on the first end 12A of the base portion 12 which is configured to couple to power cord for electrically coupling the food processing device 10 to a home power supply. A fixed power cord is also contemplated for supplying power to the present food processing device 10. The food processing device 10 further includes a switch assembly 18 disposed on the motor housing 14 having a toggle switch 18A and a button 18B. The toggle switch 18A is an ON/OFF switch configured to selectively provide power to the motor 210. The button 18B is an electronic push-button assembly configured to reverse a rotational movement of the motor 210, as further described below.

As further shown in FIG. 1A, the base portion 12 further includes a middle portion 12C disposed between first and second ends 12A, 12B. In this way, the first and second ends 12A, 12B are spaced-apart to define a processing area 20 or food substrate receiving area disposed therebetween. The middle portion 12C of the base portion 12 includes a cavity 22 which is configured to receive a removable drip tray assembly 24. The drip tray assembly 24 includes an inset collection cavity 26 which is configured to receive peelings from a food substrate processed by the food processing device 10. The drip tray assembly 24 includes a first end 24A supported on an upper platform 28 of the middle portion 12C of the base portion 12. A second end 24B is disposed over the second end 12B of the base portion 12 and is configured to receive a processing assembly 30 extending upwardly therefrom. The processing assembly 30 is removeably connected to and supported by the second end 24B of the drip tray assembly 24 and extends upwardly from the second end 24B of the base portion 12. In this way, the processing area 20 is defined between the motor housing 14, which upwardly extends from the first end 12A of the base portion 12, and the processing assembly 30, which upwardly extends from the second end 12B of the base portion 12. The processing assembly 30 is configured to process a food substrate as driven therethrough by the motor 210 of the food processing device 10. The processing assembly 30 includes a housing 32 having an outwardly extending chute portion 34. The housing 32 is a generally circular member having an inner receiving area 36 in which a number of food processing accessories are received for various food processing procedures. In the embodiment shown in FIG. 1A, a blade carrier 40 is shown having a platform 42 from which a blade member 44 inwardly extends. A coring blade 46 also inwardly extends from the platform 42. The platform 42 is generally received in a planar disk portion 48 that is disposed in the receiving area 36 of the housing 32 of the processing assembly 30. As further shown in FIG. 1A, a removable processing accessory 50A is also shown coupled to the platform 42 of the blade carrier 40. The processing accessory 50A is one of several processing accessories that can be used with the blade carrier 40. Thus, the blade carrier 40 can include a plurality of cutting features, such as the blade member 44, the coring blade 46, and the processing accessory 50A to define a unique blade configuration for processing a food substrate using the food processing device 10. The drip tray assembly 24 further includes a release lever 70 that is used to release the processing assembly 30 from a locked position on the drip tray assembly 24, as further described below.

As further shown in FIG. 1A, the drip tray assembly 24 also includes a support post 52 which is configured to support a peeler assembly 54. The peeler assembly 54 is supported from the support post 52 by a bracket member 56 which is removeably received on the support post 52. The bracket member 56 is configured to clip to an upper end of the support post 52 at a first end 56A of the bracket member 56. A second end 56B of the bracket member 56 upwardly extends from the first end 56A and includes a support arm 60 pivotally coupled thereto. The support arm 60 includes a first end 62 that is pivotally coupled to the bracket member 56, and a second end 64 having a peeling blade 66 disposed thereon. In use, the peeling blade 66 is configured to peel an outer surface or skin of a food substrate as the food substrate passes through the food processing area 20 of the food processing device 10. As pivotally coupled to the bracket member 56, the support arm 60 is configured to pivot along the path as indicated by arrow P between engaged and disengaged positions. The peeler assembly 54 may also include a removable guard assembly 114 (FIG. 1B) which is used to protect the peeling blade 66 and direct peeled portions of a food substrate into the collection cavity 26 of the drip tray assembly 24. The various features and functions of the peeler assembly 54 are further described below with particular reference to FIGS. 5A, 5B.

In use, a food substrate is loaded on to an auger assembly 80 in the processing area 20 and driven through the processing assembly 30 by the auger assembly 80 in a forward direction as indicated by arrow D. The auger assembly 80 includes a shaft 82 having first, second and third threaded portions 84, 86, 87 (FIGS. 1A and 2A) disposed thereon with non-threaded portions 88 disposed therebetween. The threaded portions 84, 86, 87 of the shaft 82 are configured to operably couple to a clutch assembly 230 (FIG. 10) which, in combination with the motor 210 (FIG. 10), powers rotation of the shaft 82 in both clockwise and counterclockwise directions as indicated by arrows R1, R2 as well as the forward and reverse linear movement of the shaft 82. The shaft 82 further includes first and second ends 90 (FIG. 10), 92. The first end 90 (FIG. 10) of the auger assembly 80 has an adjustment knob 94 disposed thereon, which extends outwardly from a guide 95 disposed on the motor housing 14. The adjustment knob 94 includes a head portion 96 and a stem portion 98, wherein the stem portion 98 abuts the guide 95 of the motor housing 14 to provide a gap or spacing 102 disposed between the head portion 96 and the guide 95 to provide an anti-pinch feature between the guide 95 and the head portion 96. The spacing 102 is also shown in the cross-sectional view of FIG. 10. The adjustment knob 94 further includes an engagement band 100 disposed around the head portion 96 which may include a rubberized material band or coating, or a textured surface for providing enhanced grip for engagement and manipulation of the adjustment knob 94 by a user. By engaging the adjustment knob 94, a user can move the auger assembly 80 in forward and rearward directions within the processing area 20 to load a food substrate on the second end 92 of the shaft 82 after the clutch assembly 230 has been released, as further described below. The second end 92 of the shaft 82 includes an engagement plate 104 releasably coupled thereto. In use, the engagement plate 104 engages an end of a food substrate for rotation with the auger assembly 80.

Figure 2A:
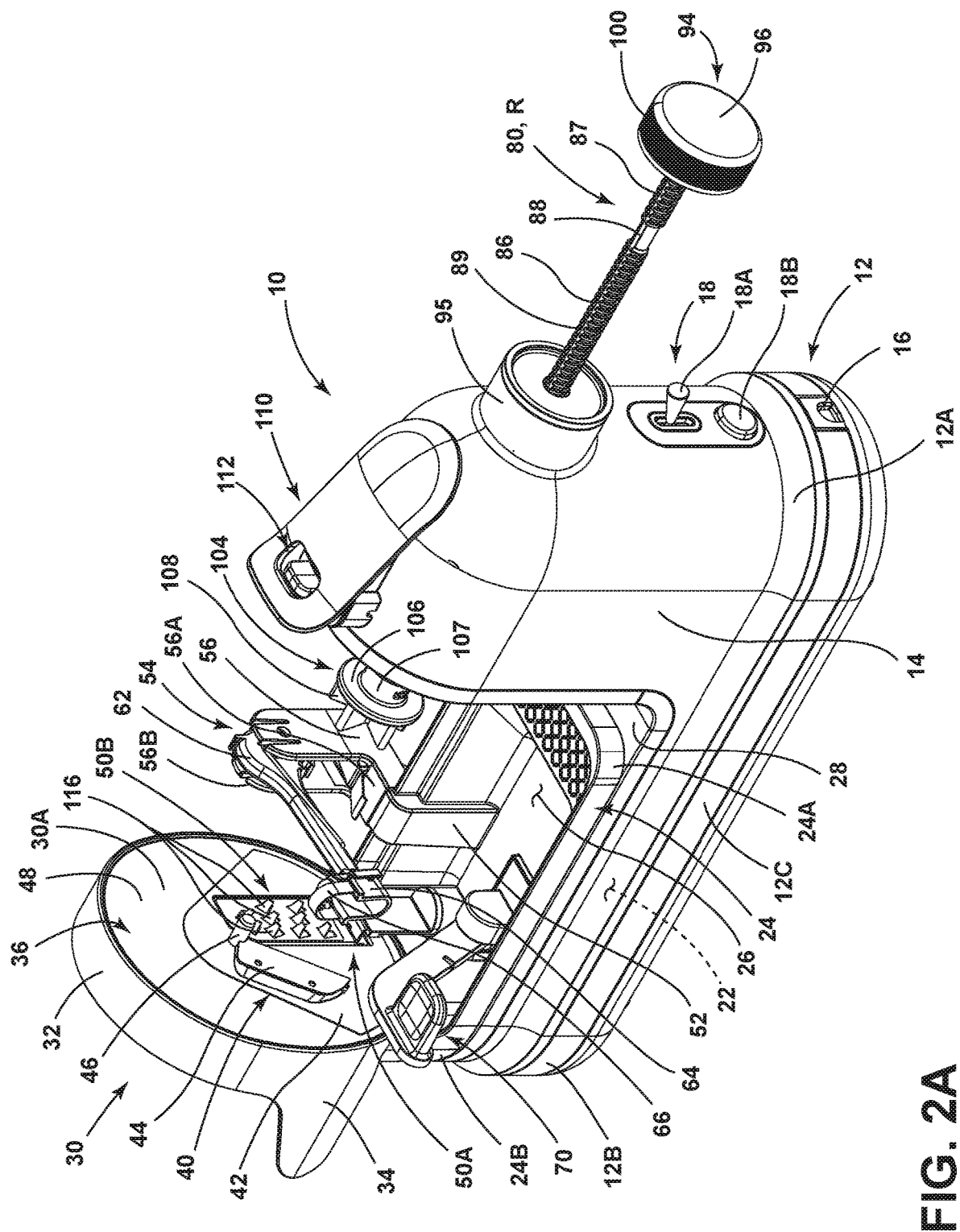
FIG. 2A is a front perspective view of the food processing device of FIG. 1A with an auger assembly in a retracted position.
Figure 3:
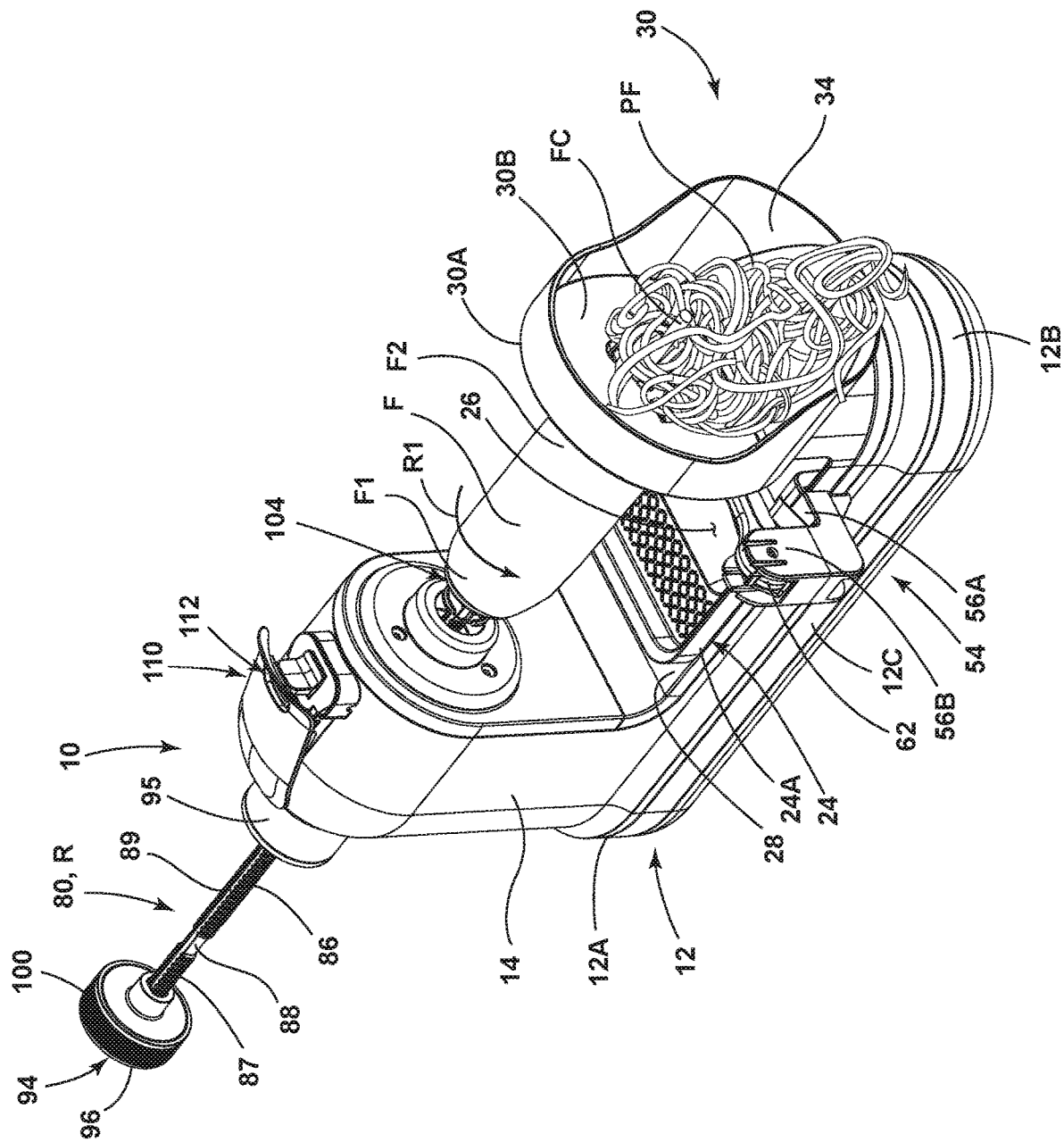
FIG. 3 is a top perspective view of the food processing device of FIG. 2A having a food substrate engaged in a processing procedure.

As further shown in FIG. 1A, the motor housing 14 includes a clutch disengagement lever 110 disposed on an upper portion thereof. The clutch disengagement lever 110 is configured to disengage a clutch assembly 230 (FIG. 10) from the auger shaft 82, such that the auger shaft 82 is free to be repositioned by a user engaging the adjustment knob 94 to slide the auger shaft 82 horizontally in forward and rearward directions as indicated by arrow A between an extended position E (FIG. 1A) and a retracted position R (FIG. 2A). In this way, the auger assembly 80 is easily laterally adjusted to accommodate food substrates of various sizes in the processing area 20, as best shown in FIG. 3. The clutch disengagement lever 110 is shown in a released position in FIG. 1A, and includes a locking member 112 which is configured to lock the clutch disengagement lever 110 in a downwardly pressed position, as further described below. Full operation of the clutch disengagement lever 110 of the food processing device 10 is further described below with specific reference to FIGS. 10-12.

Figure 1B:
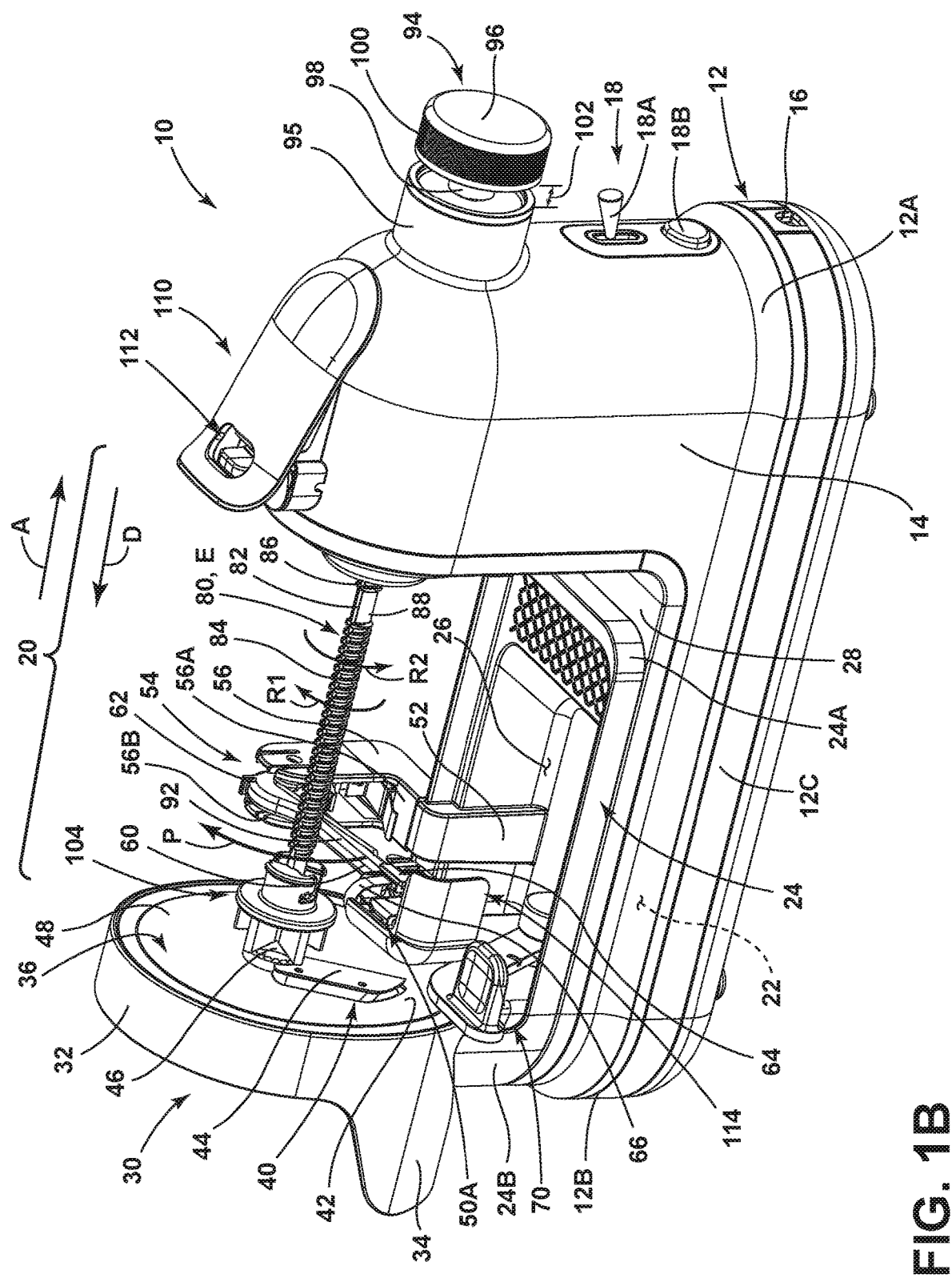
FIG. 1B is a front perspective view of the food processing device of FIG. 1B having a guard assembly.
Figure 10:
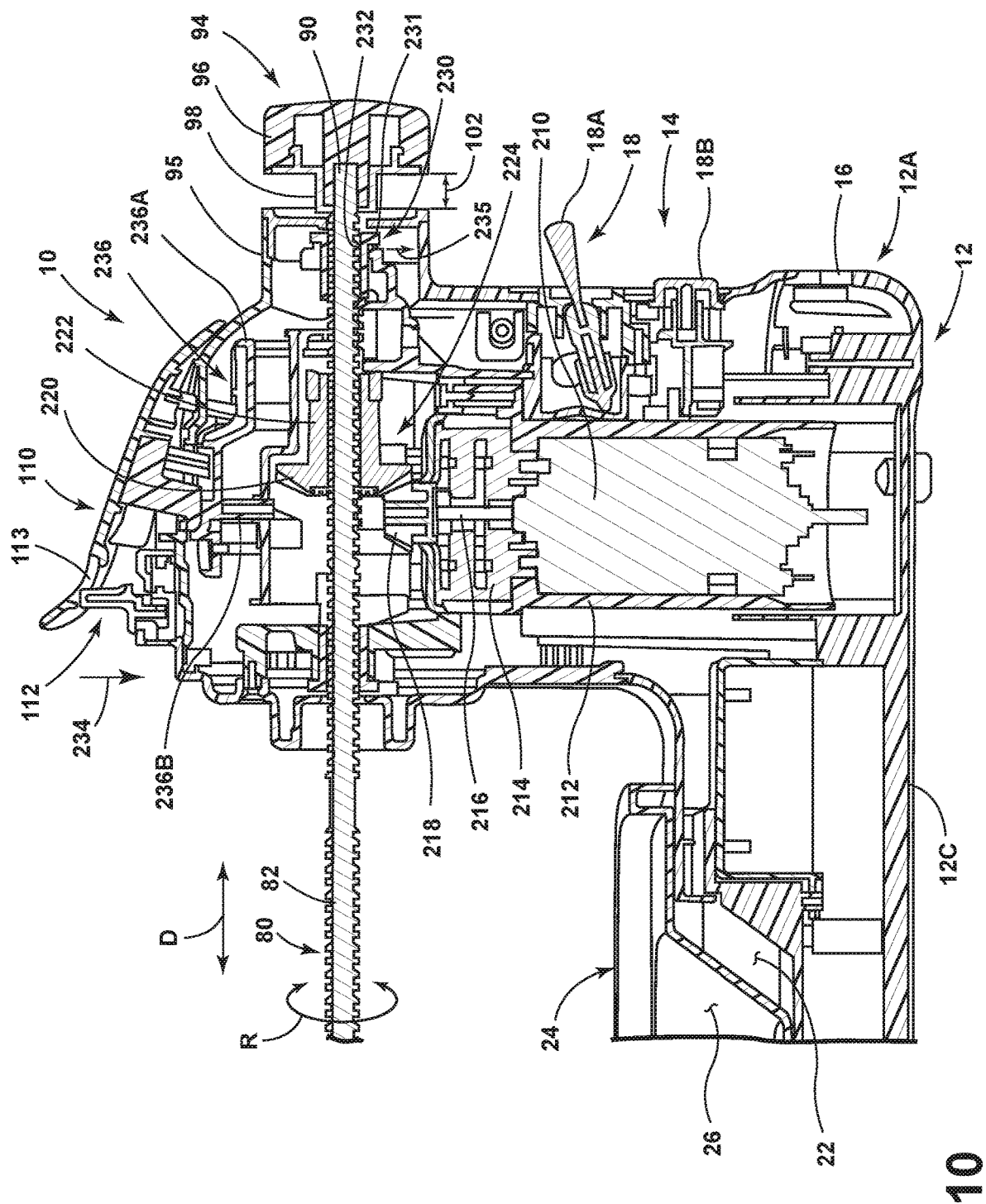
FIG. 10 is a fragmentary cross-sectional view of the food processing device of FIG. 1A taken at line X.

Referring now to FIG. 2A, the food processing apparatus 10 is shown in an open position as compared to a closed position shown in FIGS. 1A and 1B. In the open position, the auger assembly 80 is in a retracted position R. With auger assembly 80 is in a retracted position R, the food processing device 10 is configured to receive a food substrate in the processing area 20 disposed between the motor housing 14 and the processing assembly 30. A food substrate is received on the engagement plate 104, which includes a platform 106 having a coupling portion 107 that couples to the second end 92 of the auger shaft 82. The engagement plate 104 further includes a contoured blade member 108 extending outwardly from the platform 106 on an opposite side of the platform 106 relative to the coupling portion 107. The contoured blade member 108 is a sharpened food piercing member configured to pierce, engage and retain an end of a food substrate for rotation of the food substrate with the auger shaft 82 in the direction as indicated by arrows R1, R2 (FIG. 1A). When the food processing device 10 is in the open position, the auger assembly 80 is contemplated to be in a starting position or retracted position R. Once a food item is mounted on the engagement plate 104 at a first end of the food item, the second end of the food item is mounted on the coring blade 46 of the processing assembly 30 by moving the auger assembly 80 forward along the path as indicated by arrow D (FIG. 1A). Again, movement of the auger assembly 80 is provided by a disengagement or release of the auger shaft 82 from a clutch assembly 230 (FIG. 10) using the clutch disengagement lever 110. Once the food item is properly mounted between the auger assembly 80 and the processing assembly 30, the clutch disengagement lever 110 is released or unlocked, such that the clutch assembly 230 engages the auger shaft 82 to drive the auger shaft 82 forward as powered by the motor 210, as shown in FIG. 10. The motor 210 (FIG. 10) is configured to drive the auger assembly 80 and the food substrate towards the processing assembly 30 by the clutch assembly 230 engaging one of the threaded body portions 84, 86, or 87 of the auger shaft 82, as further described below. The auger shaft 82 includes a groove 89 that extends along a length thereof through the threaded portions 84, 86, and 87. In assembly, the motor 210 engages the groove 89 of the auger shaft 82 to provide rotation of the auger shaft 82. The groove 89 also allows for free linear movement of the auger shaft 82, as further described below.

As further shown in FIG. 2A, the processing assembly 30 includes a blade configuration disposed on a first side 30A of the processing assembly 30. The blade configuration includes the blade member 44 disposed to the left of a processing accessory 50B. The processing accessory 50B includes a plurality of spaced-apart blades 116 which will slice a food substrate into ribbons in a first direction as the food substrate is driven and rotated by the auger assembly 80. After the blades 116 of the processing accessory 50B slice the food substrate into ribbons, the ribbons are rotated towards and cut from the food substrate in a second direction by the blade member 44. The second directional cut of the blade member 44 is generally perpendicular to the first directional cut of the blades 116 of the processing accessory 50B. The blade member 44 guides the cut ribbons of the food substrate through an access aperture 118 (FIG. 2B) disposed through the platform 42 of the blade carrier 40. Thus, the blade configuration of FIG. 2A is configured to provide a spiral cut food substrate, as further described below.

Figure 2B:
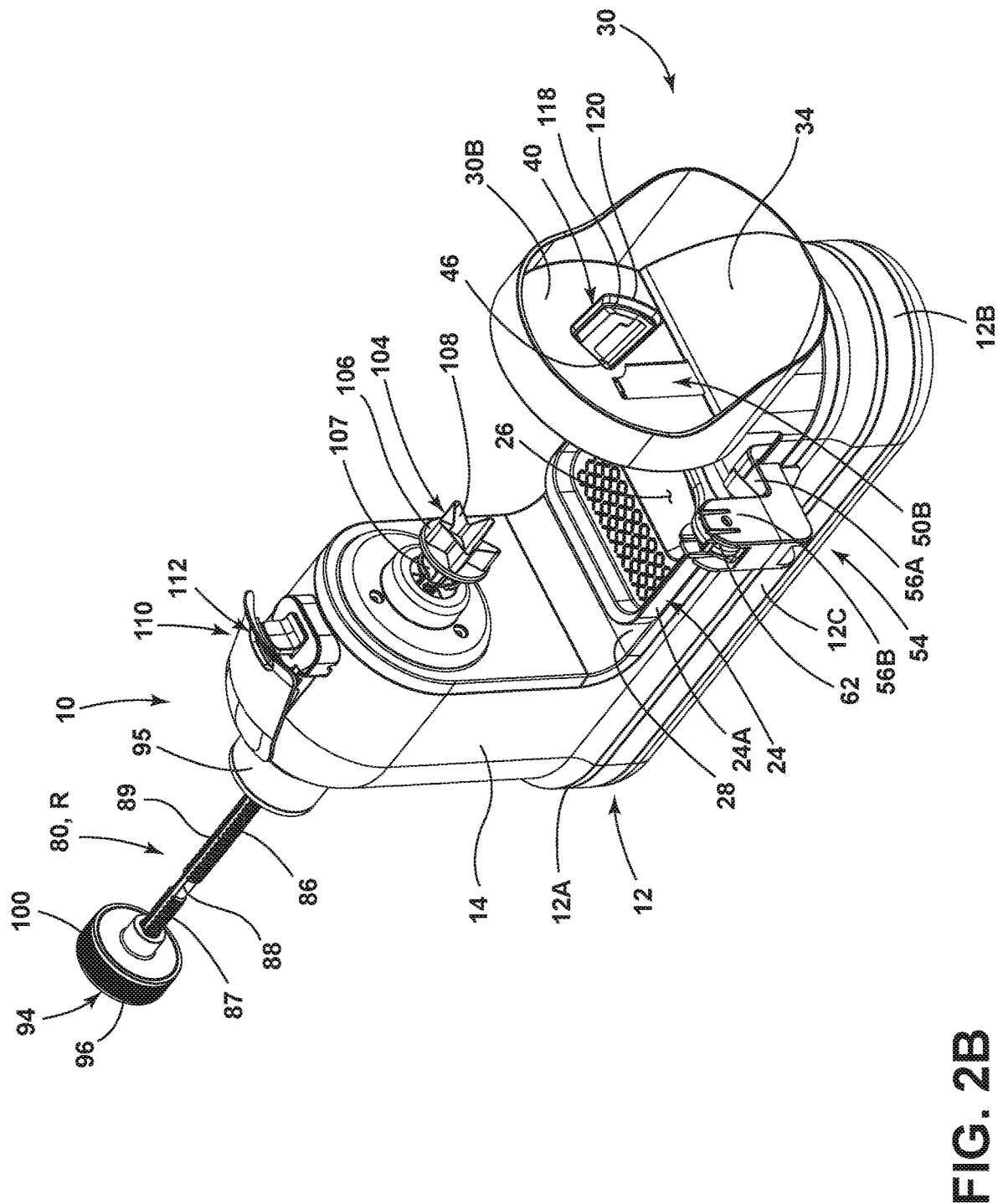
FIG. 2B is a rear perspective view of the food processing device of FIG. 2A.

Referring now to FIG. 2B, a second side 30B of the processing assembly 30 is shown, wherein access aperture 118 of the blade carrier 40 aligns with an access aperture 120 of the housing 32 of the processing assembly 30. The access aperture 118 of the blade carrier 40 and the access aperture 120 of the housing 32 of the processing assembly 30 open into the chute portion 34 of the processing assembly 30, such that a processed food substrate is received on and guided by the chute portion 34 of the processing assembly 30 for directing a processed food substrate towards a receptacle. As further shown in FIG. 2B, the coring blade 46 extends through the housing 32 of the processing assembly 30, such that a core of the food substrate will exit the second side 30B of the processing assembly 30, as further shown and described below with reference to FIG. 3.

Referring now to FIG. 3, the food processing device 10 is shown with a food substrate F received in the processing area 20, wherein the food substrate F is being processed by the processing assembly 30 to provide a spiral cut food substrate FS shown exiting the processing assembly 30 on the second side 30B thereof. The food substrate F is shown engaging the first side 30A of the processing assembly 30, such that the food substrate F is contemplated to be processed by the processing assembly 30 at the first side 30A by the blade configuration shown in FIG. 2A. Given the blade configuration of FIG. 2A, the food substrate F exits out the second side 30B of the processing assembly 30 in a processed spiralized form PF, along with a cylindrical shaped food core FC exiting from the coring blade 46. As specifically shown in FIG. 3 the food substrate F is engaged with the engagement plate 104 at a first end F1 thereof, while a second end F2 of the food substrate F is engaged with the processing assembly 30. In this way, the food substrate F rotates with the auger shaft 82 in the direction as indicated by arrow R1. While the blade configuration shown in FIG. 2A, and used for processing the food substrate F in FIG. 3, provides for a spiral cut processed food substrate PF, other blade configurations are also contemplated for use with the processing assembly 30 for providing various cuts of processed food substrate. Other configurations and adjustments to the blade configuration of the processing assembly 30 are described below.

Figure 4B:
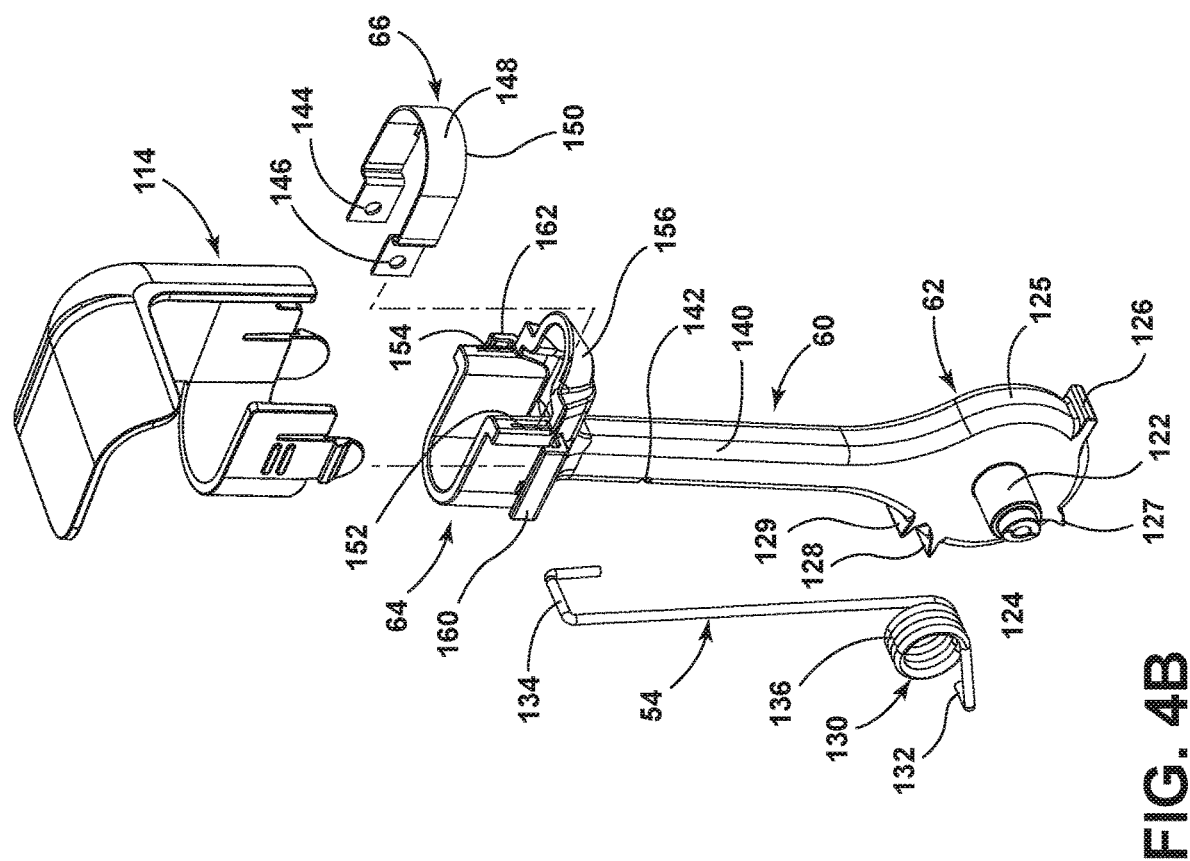
FIG. 4B is an exploded perspective view of the peeler assembly of FIG. 4A.
Figure 4A:
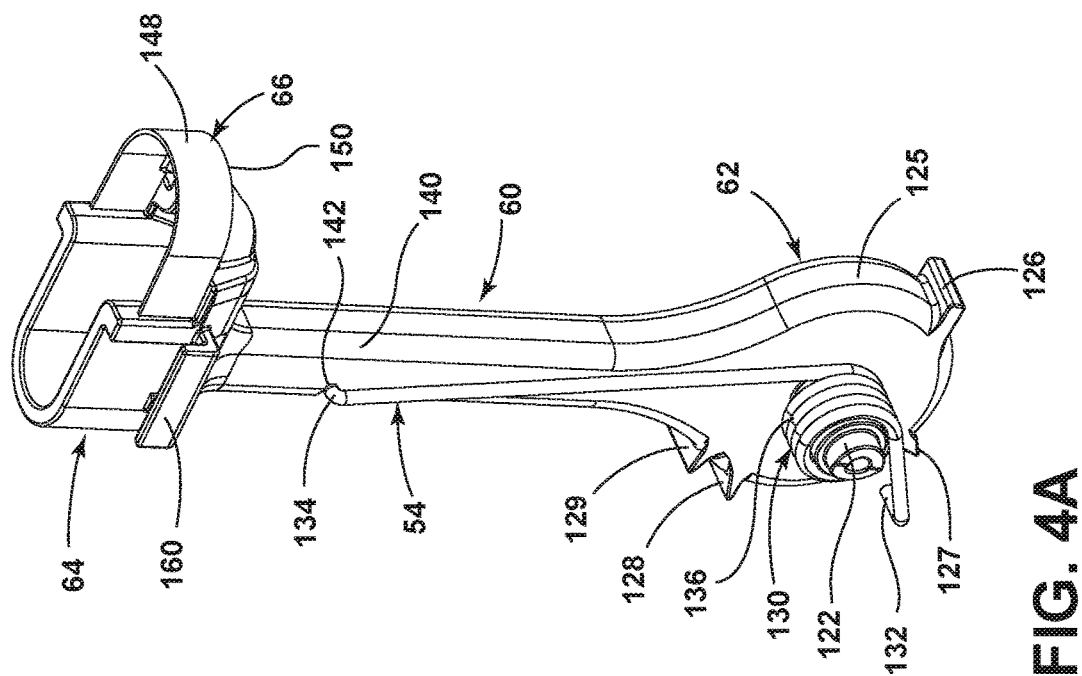
FIG. 4A is a perspective view of a peeler assembly of the present concept.

Referring now to FIGS. 4A and 4B, the peeler assembly 54 is shown having the support arm 60 supporting the peeling blade 66. The support arm 60 includes the first end 62 which defines a base portion of the support arm 60. As noted above, the base portion 62 of the support arm 60 is configured to couple to the second end 56B of the bracket member 56 as shown in FIG. 1A. The base portion 62 includes an outwardly extending mounting boss 122 which operably couples to the bracket member 56 in assembly. The mounting boss 122 includes a cylindrical body portion 124 on which a spring member 130 is received. The base portion 62 generally includes a rounded edge 125 having a plurality of outwardly extending engagement members 126-129 spaced-apart thereon. The spring member 130 includes first and second ends 132, 134 having a coiled portion 136 disposed therebetween. The first end 132 couples to the base portion 62 at engagement member 127. The second end 134 couples to a shaft portion 140 of the support arm 60 and is configured to be received in a notch 142 disposed thereon. The shaft portion 140 of the support arm 60 extends between the first and second ends 62, 64 of the support arm 60. The coiled portion 136 of the spring member 130 is mounted on the mounting boss 122 at the cylindrical body portion 124 thereof. In assembly, the second end 132 of the spring member 130 couples to the bracket member 56 to bias the peeler assembly 54 in an upward direction, as further described below. The engagement members 126-129 disposed on the base portion 62 of the support arm 60 are configured to engage a spring clip disposed on the bracket member 56 to lock the peeler assembly 54 in various positions.

With specific reference to FIG. 4B, the peeling blade 66 is shown having a generally u-shaped configuration with first and second ends 144, 146 with a curved middle portion 148 disposed therebetween. The curved middle portion 148 includes a cutting edge 150. The first and second ends 146, 144 are configured to be received in mounting slots 152, 154 disposed on the upper second end 64 of the support arm 60. The upper second end 64 of the support arm 60 further includes an outer nose portion 156 which generally follows the contours of the middle portion 148 of the peeling blade 66. In assembly, as shown in FIG. 4A, the outer nose portion 156 of the second end 64 of the support arm 60 is inset relative to the cutting edge 150 of the peeling blade 66. In this way, the peelings of a food substrate are configured to be received through a gap between the peeling blade 66 and the outer nose 156. The second end 64 of the support arm 60 further includes mounting brackets 160, 162 which are configured to receive portions of the removable guard assembly 114 to removeably mount the guard assembly 114 on the peeler assembly 54. In use, peelings from a food substrate would be directed towards the removable guard assembly 114 from the peeling blade 66. The guard assembly 114 would then deflect the peelings of the food substrate into the collection cavity 26 of the drip tray assembly 24 for collection therein. The guard assembly 114 is noted as a removable guard assembly, such that the guard assembly 114 can be removed and cleaned easily. Further, the entire peeler assembly 54 can be removed from the bracket member 56 for cleaning, and the bracket member 56 can be removed from support post 52 of the food processing device 10 as further described below.

Figure 5B:
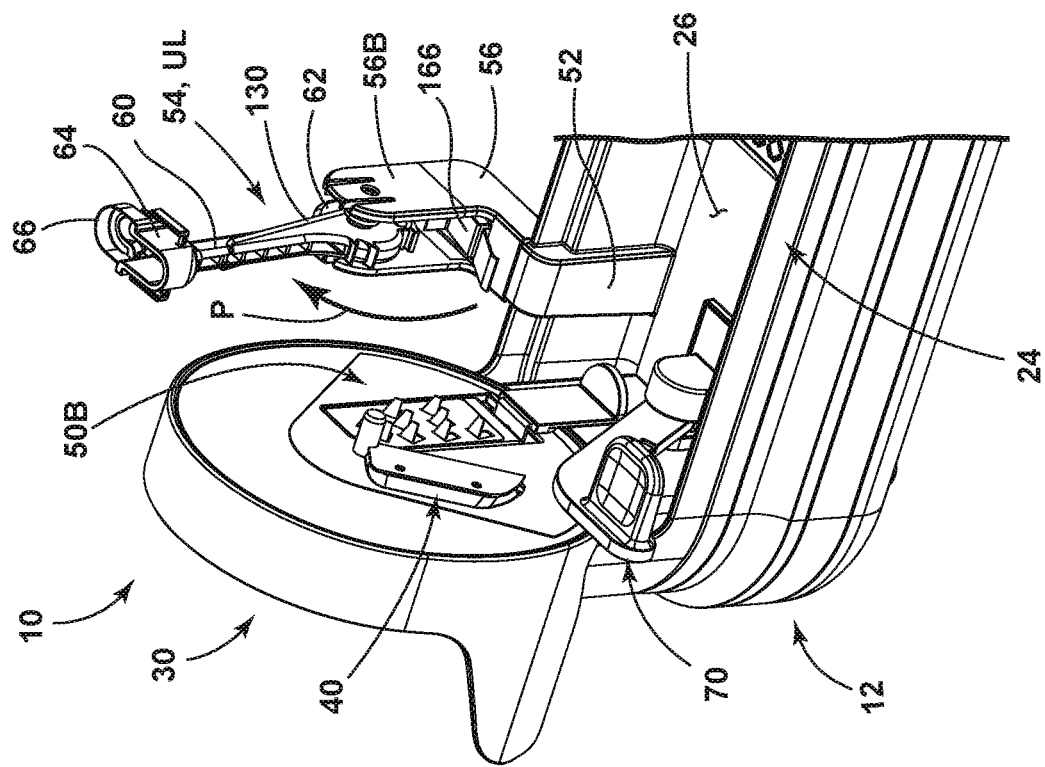
FIG. 5B is a fragmentary perspective view of the food processing device of FIG. 5A showing the peeler assembly in an upper locked position.
Figure 5A:
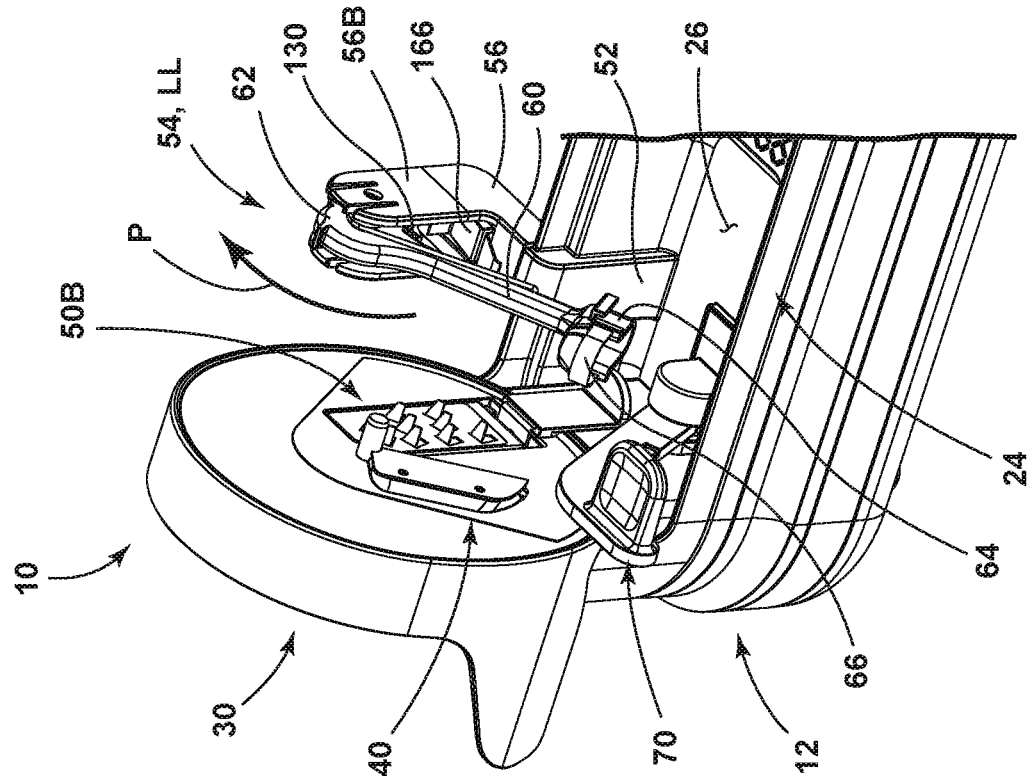
FIG. 5A is a fragmentary perspective view of the food processing device of FIG. 1 showing a peeler assembly in a lower locked position.

Referring now to FIGS. 5A and 5B, the peeler assembly 54 is shown mounted to the base portion 12 of the food processing device 10. The peeler assembly 54 is disposed adjacent to and upstream from the processing assembly 30, such that a food substrate can be peeled by the peeler assembly 54, before being further processed by the processing assembly 30. With specific reference to FIG. 5A, the peeler assembly 54 is shown pivotally mounted to the second end 56B of the bracket member 56 at base portion 62. In FIG. 5A, the peeler assembly 54 is shown in a lower locked position LL. The peeler assembly 54 is locked in the lower locked position LL by a clip member 166 disposed within the bracket member 56. In use, the clip member 166 may be a resilient clip member, such as a spring clip, that engages one of the engagement members 126-129 to selectively lock the peeler assembly 54 in various positions. The spring member 130 is shown coupled to the support arm 60 and the bracket member 56 to bias the peeler assembly 54 in an upward direction as indicated by arrow P. Thus, in locking the peeler assembly 54 in the lower locked position LL, a user will push the support arm 60 downward against the force of the spring member 130 until a desired engagement member 126-129 is engaged with the clip member 166 of the bracket member 56.

With specific reference to FIG. 5B, the peeler assembly 54 is shown in an upper locked position UL, wherein the peeler assembly 54 is shown upwardly pivoted away from the base portion 12 of the food processing device 10. In use, the peeler assembly 54 can be moved to the lower locked position LL of FIG. 5A or the upper locked position UL of FIG. 5B to move the peeler assembly 54 out of the way when a user loads a food substrate, or when a user desires to process a food substrate using the processing assembly 30 alone (without peeling the food substrate). When a user wishes to use the peeler assembly 54 along with the processing assembly 30, a user will generally move the peeler assembly 54 to the lower locked position LL before mounting the food substrate. Once the food substrate is mounted, the user will unlock the peeler assembly 54 from the lower locked position LL, such that the peeling blade 66 makes contact with an outer surface of the food substrate. As the food substrate is driven in a clockwise direction (as indicated by arrow R1 in FIG. 1A), the outer surface of the food substrate will be peeled by the peeler assembly 54. With the spring member 130 biasing the peeler assembly 54 in the upper direction as indicated by arrow P, the peeler assembly 54 allows for the peeling blade 66 to remain in consistent contact with the outer surface of a food substrate even if the food substrate has uneven surfaces, or a contoured outer skin. With the biasing action of the spring member 130, the peeler assembly 54 is configured to peel a consistent depth of an outer surface of a food substrate which is generally governed by the distance between the outer nose portion 156 (FIG. 4B) of the second end 64 of the support arm 60 and the cutting edge 150 of the peeling blade 66.

Figure 6A:
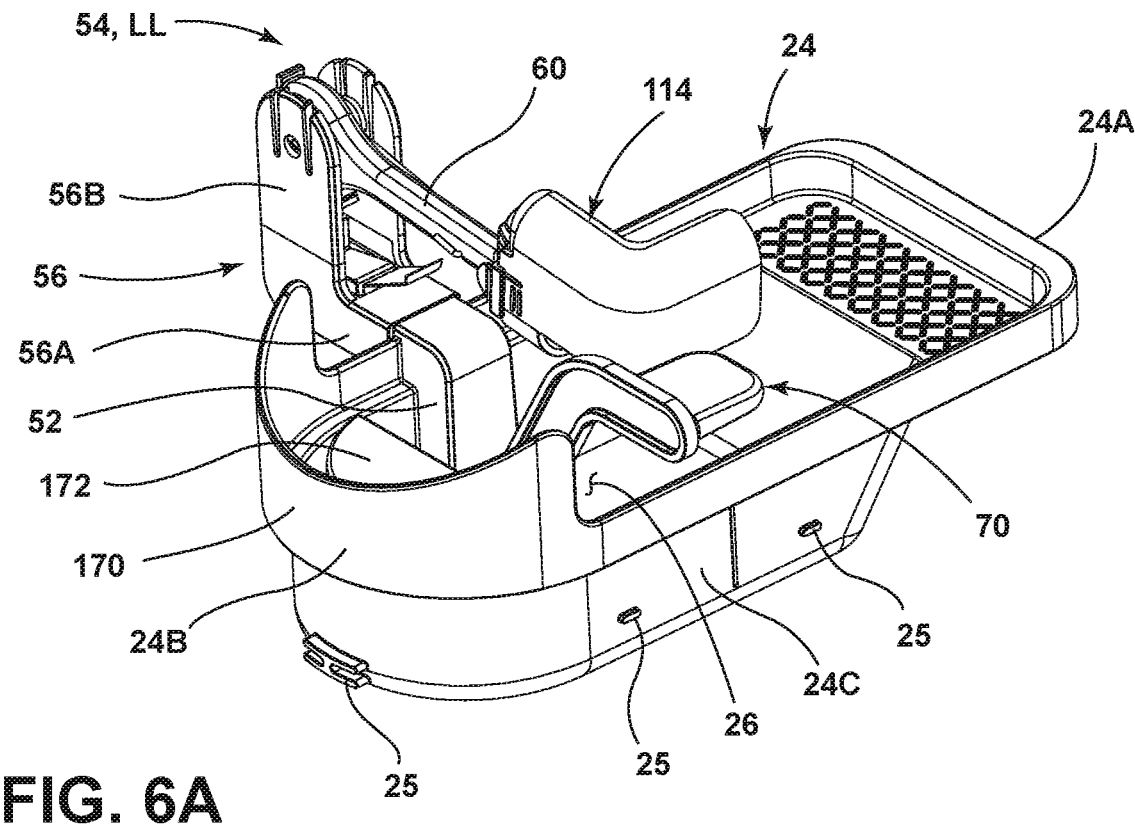
FIG. 6A is a top perspective view of a drip tray assembly with a peeler assembly coupled thereto.

Referring now to FIG. 6A, the drip tray assembly 24 is shown removed from the food processing device 10 (FIG. 1A). The drip tray assembly 24 includes a base portion 24C having a number of engagement features 25 that are used to retain the drip tray assembly 24 in the cavity 22 of the food processing device 10. The drip tray assembly 24 is removable from the food processing device 10 to provide for easy cleaning. As shown in FIG. 6A, the drip tray assembly 24 includes an upwardly extending guard 170 disposed on the second end 24B of the drip tray assembly 24. Adjacent the guard 170, a support member 172 is disposed. The support member 172 includes a clip member 174 (FIG. 6B) that is used to engage and retain the processing assembly 30 thereon. Thus, the support member 172 is a structural component of the drip tray assembly 24 that receives a base portion of the processing assembly 30 to upwardly support the same. The clip member 174 engages the base portion of the processing assembly 30 to retain the processing assembly 30 in a proper position on the drip tray assembly 24, as shown in FIG. 1A. As further shown in FIG. 6A, the peeler assembly 54 is shown in the lower locked position LL with the removable guard assembly 114 disposed on the support arm 60.

Figure 6B:
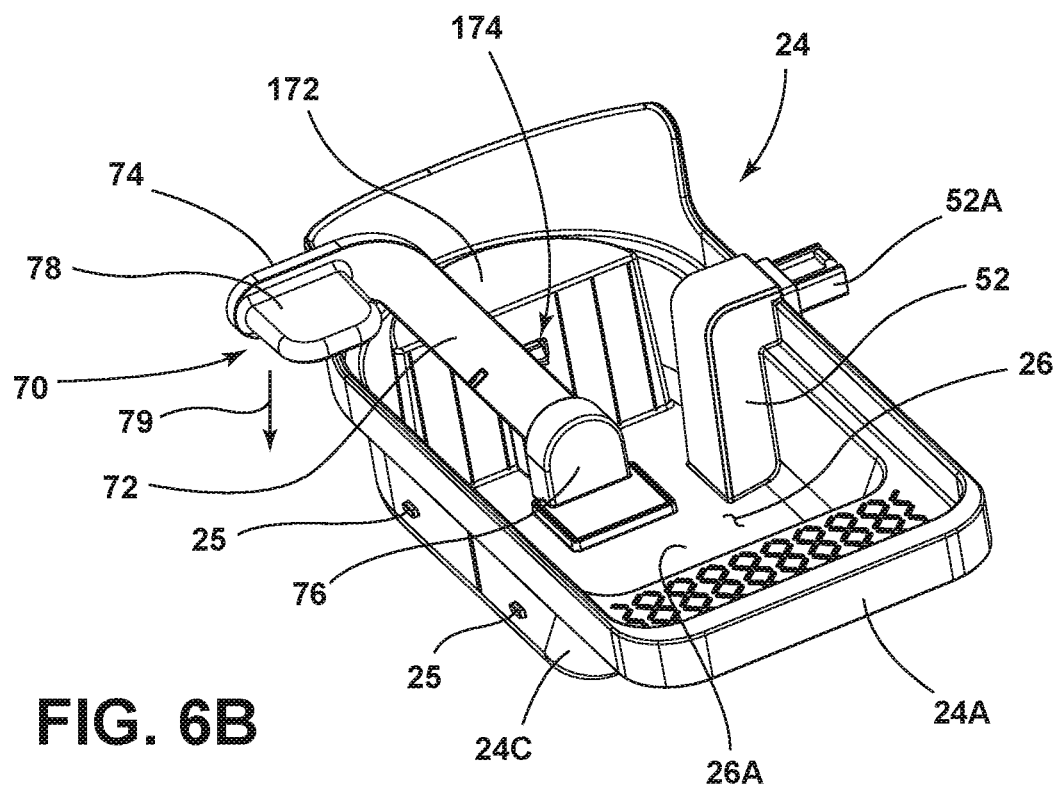
FIG. 6B is a top perspective view of the drip tray assembly of FIG. 6A with the peeler assembly removed.

Referring now to FIG. 6B, the peeler assembly 54 is shown removed from the coupled position with the drip tray assembly 24 as shown in FIG. 6A. With the peeler assembly 54 removed, a clip member 52A of the support post 52 is shown which is used to clip to the first end 56A of the bracket member 56 of the peeler assembly 54. In this way, the peeler assembly 54 can be removed from the drip tray assembly 24 for cleaning or when the desired food processing procedure does not require a peeler. As further shown in FIG. 6B, the release lever 70 is shown having a shaft portion 72 having an upper end 74 and a lower end 76. The lower end 76 is operably coupled to the clip member 174 of the support member 172. The upper end 74 of the shaft portion 72 of the release lever 70 includes a handle 78 which is engaged by a user and downwardly pressed in the direction as indicated by arrow 79 to release the clip member 174 from engagement with a base portion of the processing assembly 30. In this way, the release lever 70 actuates the release of the processing assembly 30 to be removed from the drip tray assembly 24 for cleaning or storage. The lower portion 76 of the shaft 72 of the release lever 70 is pivotally coupled to a bottom wall 26A of the collection cavity 26 of the drip tray assembly 24. Again, the pivoting action of the release lever 70 causes the disengagement of the clip member 174 with a base portion of the processing assembly 30, as further described below.

Figure 7:
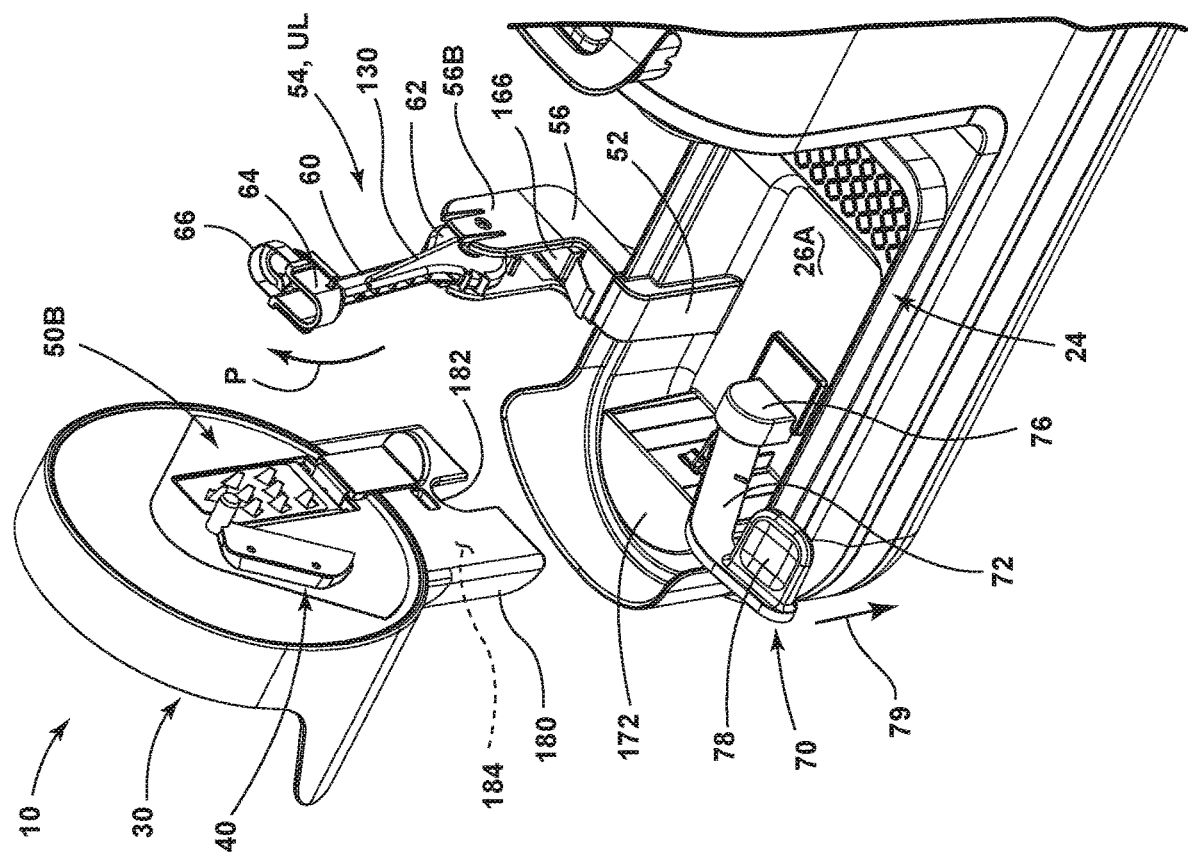
FIG. 7 is a fragmentary perspective view of the food processing device of FIG. 5B showing a processing assembly released and exploded away from the food processing device.

Referring now to FIG. 7, the processing assembly 30 is shown removed from the support member 172 of the drip tray assembly 24. Removal of the processing assembly 30 requires the downward movement of the release lever 70 in a direction as indicated by arrow 79 which is generally conducted by a user engaging the handle 78 of the release lever 70 and pushing the same downward to a pressed position. This downward movement of the release lever 70 from the at-rest position shown in FIG. 7 releases the clip member 174 from an engagement aperture 182 disposed on the base portion 180 of the processing assembly 30. With the release lever 70 held in the downward pressed position, a user can upwardly lift the processing assembly 30 from its engagement with the drip tray assembly 24. As shown in FIG. 7, the base portion 180 of the processing assembly 30 includes a specific contour that mirrors a contour of the support member 172. Thus, the base portion 180 of the processing assembly 30 is configured to closely receive the support member 172 of the drip tray assembly 24 in a contoured inner cavity 184 thereof.

Figure 8:
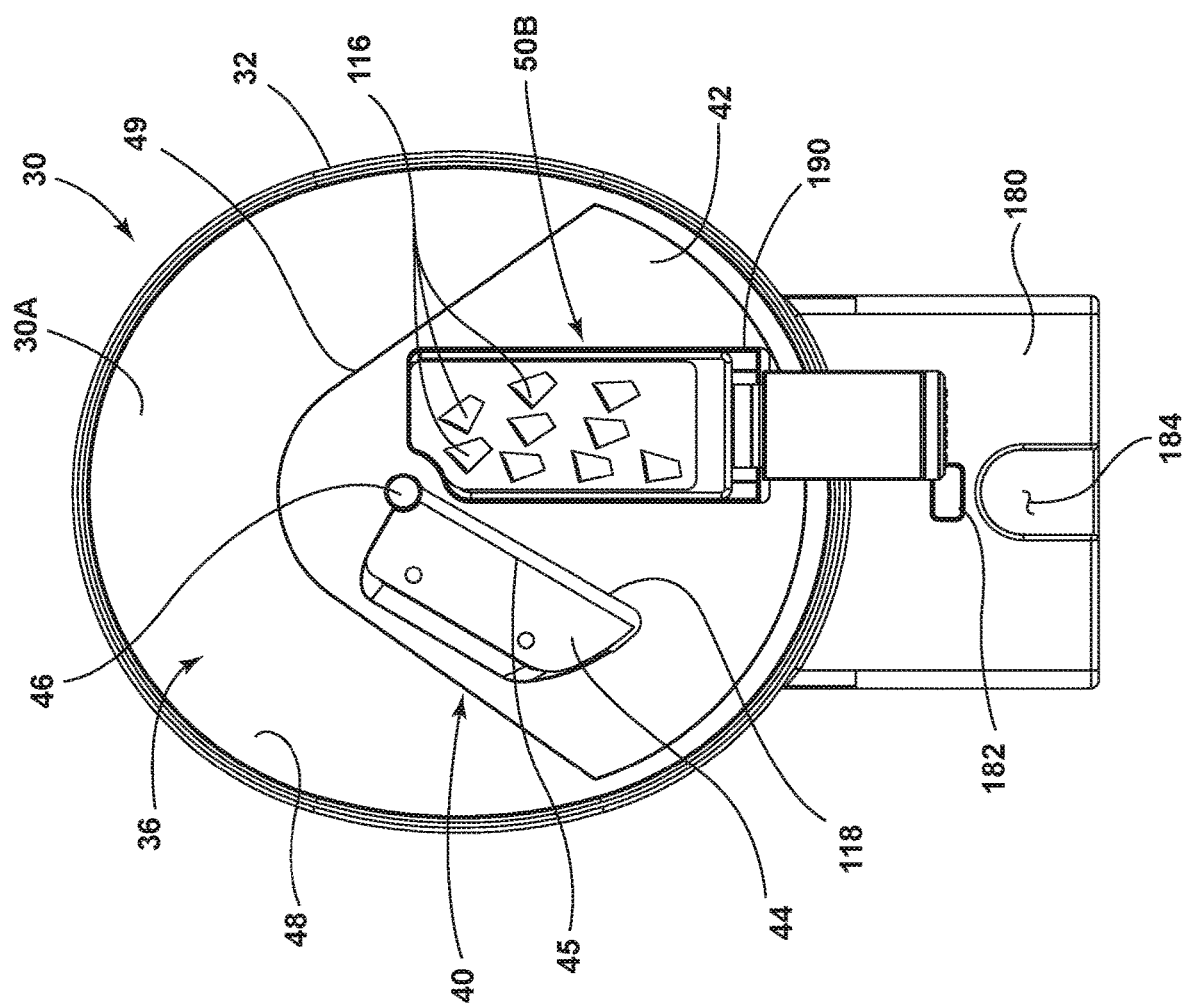
FIG. 8 is a front elevational view of a processing assembly.

Referring now to FIG. 8, the processing assembly 30 is shown having the housing 32 disposed in a generally circular configuration around the receiving area 36. The receiving are 36 includes a planar disk portion 48 having an inset receiving aperture 49 disposed therein. The receiving aperture 49 includes outer perimeters which are similar to outer perimeters of the platform 42 of the blade carrier 40 which is received therein. As shown in the embodiment of FIG. 8, the blade carrier 40 includes a blade member 44 which extends from the platform 42 over an access aperture 118 disposed through the platform 42. The blade member 44 includes a cutting edge 45 which is configured to slice a food substrate after the food substrate has been processed by the processing accessory 50B. The configuration of the blade member 44 provides for a sliced food substrate to be guided through the access aperture 118 to move the food substrate from the front side 30A of the processing assembly 30 to the rear side 30B of the processing assembly 30 (as best shown in FIG. 2B). The blade carrier 40 further includes the coring blade 46 used to core a food substrate as processed in the food processing device 10. As further shown in FIG. 8, the blade carrier 40 further includes a receiving aperture 190 which is configured to receive a processing accessory, such as processing accessory 50B. As noted above, the processing accessory 50B includes a plurality of outwardly extending blades 116 which are used to slice a food substrate into noodle like strips before the food substrate is sliced again by the blade member 44 of the blade carrier 40. The processing accessory 50B is one of multiple processing accessories which can be used with the processing assembly 30 to provide various blade configurations for the blade carrier 40. As further shown in FIG. 8, the housing 32 of the processing assembly 30 is shown supported by the base portion 180 of the processing assembly 30.

Figure 9:
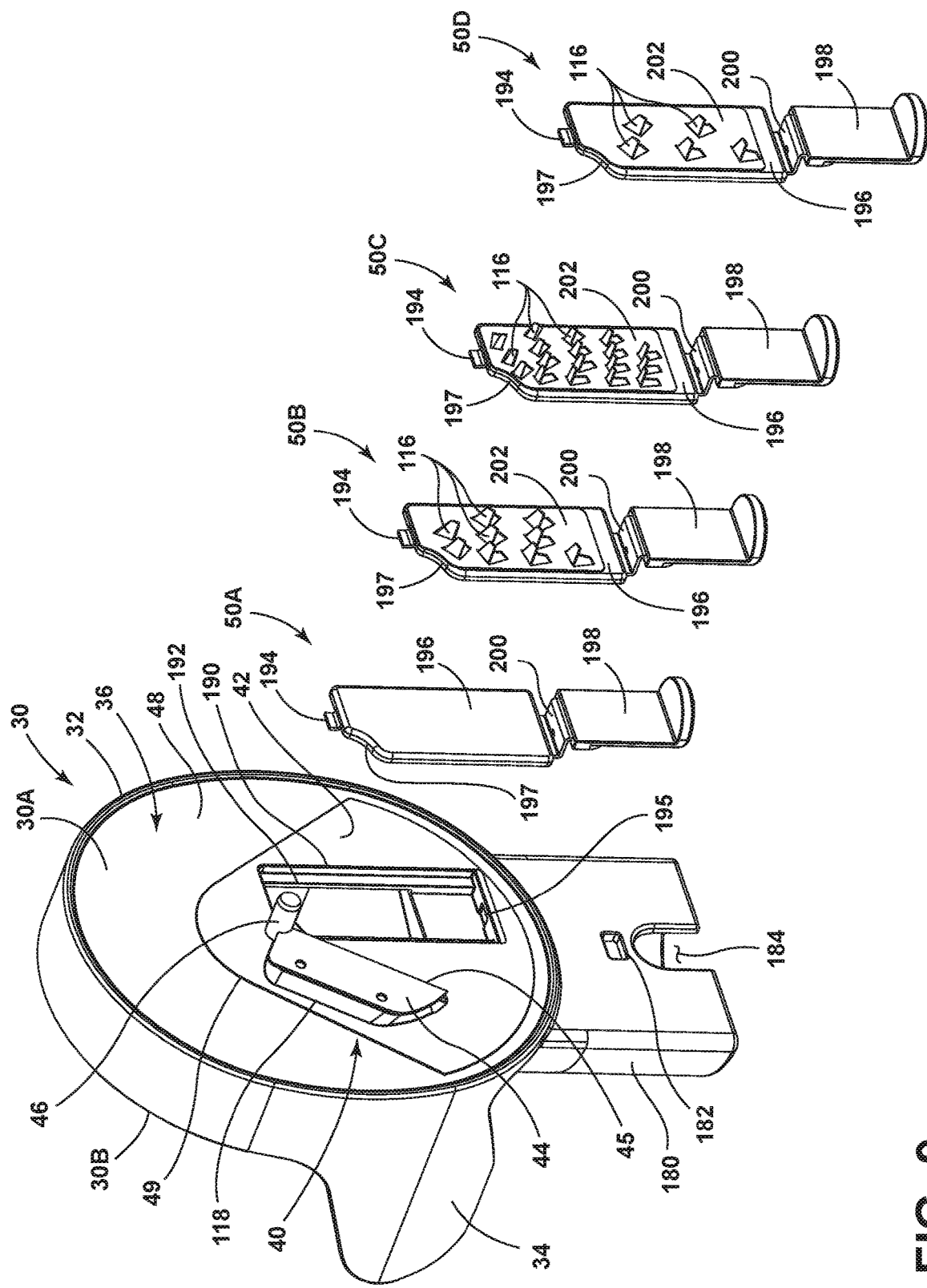
FIG. 9 is a top perspective view of the processing assembly of FIG. 8 showing a variety of processing accessories for use with the same.

Referring now to FIG. 9, the processing assembly 30 is shown having receiving aperture 190 of the blade carrier 40 aligned with an access aperture 192 of the planar disk portion 48 of the processing assembly 30. As noted above, receiving aperture 190 of the blade carrier 40 is configured to receive a processing accessory, such as the processing accessories 50A-50D shown in FIG. 9. The processing accessories 50A-50D are interchangeable accessories having upper engagement tabs 194 which are configured to be received in engagement slots 195 of the processing assembly 30. It is contemplated that the processing accessories 50A-50D include upper and lower engagement tabs, such as upper engagement tab 194, that are configured to be received in upper and lower engagement slots, such as lower engagement slot 195 of the processing assembly 30. Each processing accessory 50A-50D further includes a platform portion 196 that is flexibly coupled to a handle portion 198 by a flexible interconnecting member 200. In use, a user will engage the handle portion 198 of a processing accessory to couple the platform portion 196 with the receiving aperture 190 of the blade carrier 40. Each platform portion 196 further includes an inset outer corner portion 197 which is configured to accommodate for the position of the coring blade 46 on the blade carrier 40.

With specific reference to processing accessory 50A, the platform portion 196 is a generally planar surface that is a blade-free surface having no processing features disposed thereon. Thus, when the processing accessory 50A is mounted to the processing assembly 30 (such as shown in FIG. 1A), a food substrate processed using this blade configuration will be sliced into a singular wide ribbon by the cutting edge 45 of the blade member 44. With specific reference to processing accessory 50B, a blade assembly 202 is shown disposed on the platform portion 196 having a plurality of outwardly extending blades 116. Similarly, processing accessories 50C and 50D also include blade assemblies 202 having outwardly extending blades 116 disposed thereon. The processing accessories 50B-50D are configured to slice a food substrate into ribbons or strips before the food substrate is sliced by the blade member 44. Processing accessory 50D is specifically configured with the blades 116 spaced further apart than the blades 116 of processing accessories 50B and 50C to provide a coarse sliced food substrate. The blades 116 of processing accessory 50C are closer together than the blades 116 of processing accessory 50B and 50D, such that the blade assembly 202 of processing accessory 50C provides for a fine sliced food substrate. Processing accessory 50B provides for a food substrate that is a medium sliced food substrate in that the strips and ribbons of processing accessory 50B have a width that is somewhere between the greater width provided by processing accessory 50D and the smaller width provided by processing accessory 50C. Thus, given the various processing accessories 50A-50D, a user can customize the processing assembly 30 to include a blade configuration of their choosing. Further, the blade carrier 40 may include a blade member disposed further from the platform 42 as compared to blade member 44, to provide a thicker sliced food substrate. Similarly, a blade member can be disposed closer to the platform 42 than blade member 44 to provide for a thinner sliced food substrate. The blade carrier 40 can also include various sized coring blades that are larger or smaller than coring blade 46 for providing specific options for various food substrates.

Referring now to FIG. 10, the motor 210 is configured to power the food processing device 10 and is encased within a motor covering 212 within the motor housing 14. The motor 210 is operably coupled to a coupler 214 which includes a drive shaft 216 extending upwardly and outwardly therefrom. The drive shaft 216 is coupled to a first beveled gear 218 which is gearingly engaged with a second beveled gear 220. The first beveled gear 218 rotates along a substantially horizontal axis, while the second beveled gear 220 rotates on a substantially vertical axis. With the axes of rotation of the first and second beveled gears 218, 220 being perpendicular to one another, the vertically rotating drive shaft 216 of the motor 210 is able to translate to horizontal rotation of the auger assembly 80. The second beveled gear 220 includes an engagement portion 222 which is operably coupled to the auger shaft 82 by engaging the groove 89 disposed along the auger shaft 82. The groove 89, best shown in FIG. 2A, runs the length of the auger shaft 82 through the threaded portions 84, 86, 87 (FIGS. 1A and 2A) thereof. Thus, when the auger shaft 82 is not rotating, the groove 89 allows for the auger shaft 82 to freely slide horizontally through the engagement portion 222 of the second beveled gear 220 so that a user can easily reposition the auger shaft 82 for mounting or releasing a food substrate therefrom. The first and second beveled gears 218, 220 define a gear box 224 disposed within the motor housing 14 that is configured to drive the auger shaft 82 in the direction as indicated by arrow R. It is contemplated that any number of gears or geared configurations may exist within the gear box 224 for translating rotational movement from the motor 210 to the linear movement of the auger shaft 82 in the direction as indicated by arrow D towards the processing assembly 30.

As further shown in FIG. 10, the food processing device 10 includes a clutch assembly 230 having an arm 231 with threads 232 disposed thereon. The threads 232 are configured to engage the threaded portions 84, 86 and 87 of the auger shaft 82 to translate the rotating motion of the auger shaft 82 into linear movement along the path as indicated by arrow D. Thus, the motor 210 rotates the auger shaft 82 using the first and second beveled gears 218, 220 of the gear box 224. The clutch assembly 230 is operable between engaged and disengaged positions with the auger shaft 82. When the clutch assembly 230 is in an engaged position, the threads 232 of the clutch assembly 230 engage one of the threaded portions 84, 86, 87 of the auger shaft 82 to translate the rotational movement of the auger shaft 82 into linear movement along the path as indicated by arrow D. When the clutch assembly 230 is in a disengaged position relative to the auger shaft 82, the threads 232 of the clutch assembly 230 are spaced-apart from and not engaged with any of the threaded portions 84, 86, or 87 of the auger shaft 82. The clutch assembly 230 is moved between engaged and disengaged positions with the auger shaft 82 via the clutch disengagement lever 110. In FIG. 10, the clutch disengagement lever 110 is shown in a released position, such that the clutch assembly 230 is engaged with the auger shaft 82. As noted above, the clutch disengagement lever 110 can be pushed downward in a direction as indicated by arrow 234 to a pressed position, wherein the downward movement of the clutch disengagement lever 110 selectively actuates downward movement of the arm 231 of the clutch assembly 230 along the path as indicated by arrow 235. When the clutch assembly 230 has moved downward along the path as indicated by arrow 235, the threads 232 of the clutch assembly 230 are no longer engaged with the auger shaft 82. When the clutch assembly 230 is in this disengaged position, a user can slide the auger shaft 82 linearly by using the adjustment knob 94 to freely move the auger shaft 82 along the path as indicated by arrow D through the motor housing 14.

Figure 11:
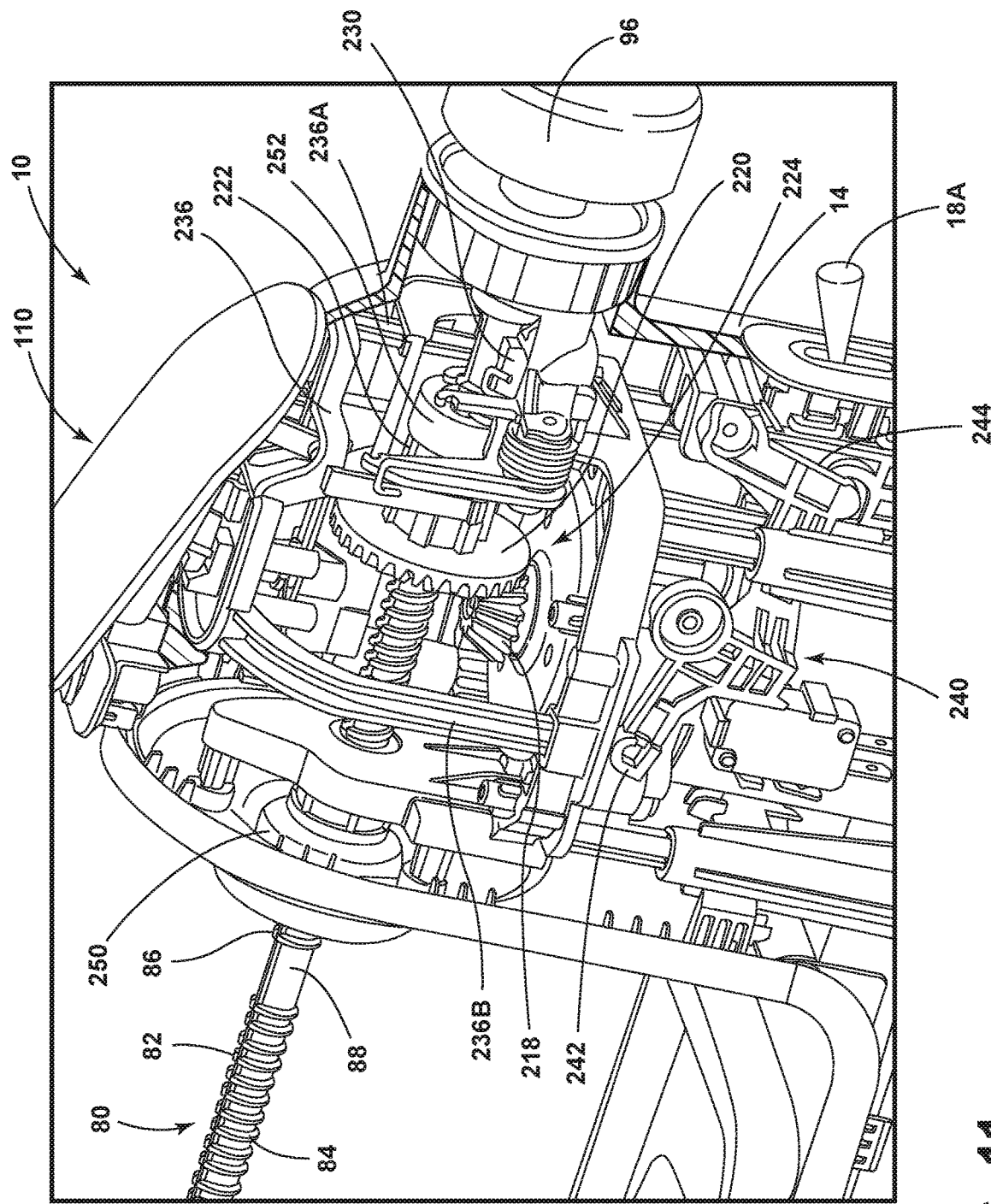
FIG. 11 is a fragmentary top perspective view of the food processing device of FIG. 1A with a portion of a motor housing removed.

As further shown in FIG. 10, the clutch assembly 230 is operably coupled to the clutch disengagement lever 110 by a bracket 236 having a first end 236A and a second end 236B. The first end 236A engages the clutch assembly 230 at the arm 231 thereof to move the clutch assembly 230 between the engaged and disengaged positions based on movement of the clutch disengagement lever 110. The locking member 112 extends through an aperture 113 of the clutch disengagement lever 110 to lock the clutch disengagement lever 110 in the downward pressed position. The clutch disengagement lever 110 is a disengagement feature which also includes a safety feature, wherein the toggle switch 18A cannot be operated in the forward motor-on position (shown in FIG. 10) when the clutch disengagement lever 110 is downwardly pressed along the path as indicated by arrow 234. The toggle switch 18A is operably coupled to the bracket 236 of the clutch disengagement lever 110 via a lever 240 as best shown in FIG. 11. The lever 240 includes an engagement end 242 which engages the second end 236B of bracket 236 when the clutch disengagement lever 110 is downwardly pressed. Thus, the clutch disengagement lever 110 can be downwardly pressed and locked by the locking member 112, such that a user can freely move the auger assembly 80 for mounting a food substrate thereto. Again, the free movement of the auger assembly 80 is due to the disengagement of the clutch assembly 230 via the clutch disengagement lever 110. While the clutch disengagement lever 110 is locked in the downward pressed position, lever 240 has engaged the toggle switch 18A at end 244 due to an interaction between the lever 240 at engagement end 242 with second end 236B of bracket 236. When the food substrate is properly mounted on the auger assembly 80, a user will disengage the locking member 112 from the clutch disengagement lever 110, such that the clutch disengagement lever 110 moves to the upward released position, to which it is biased, as shown in FIG. 10. This movement of the clutch disengagement lever 110 allows for the toggle switch 18A to be activated while the clutch assembly 230 to reengage the auger shaft 82. During a food processing procedure, the clutch disengagement lever 110 can also be used as a safety switch to stop the operation of the food processing device 10 by pressing the clutch disengagement lever 110 downward. Again, this movement of the clutch disengagement lever 110 shuts off the motor 210 by cutting power at the toggle switch 18A of the food processing device 10 by moving the toggle switch 18A of the switch assembly 18 to an OFF position. As further shown in FIG. 11, first and second bushing assemblies 250, 252 are disposed on opposite ends of the portion of the auger shaft 82 that is disposed within the motor housing 14 to stabilize the same. In another embodiment, it is contemplated that the clutch disengagement lever 110 shuts off the motor 210 by cutting power at the toggle switch 18A and disengaging the clutch assembly 230 from the auger shaft 82. In this embodiment, there is no locking member, such as locking member 112. Thus, in this embodiment, the toggle switch 18A alone is moved from the OFF position to the ON position to prepare the food processing device 10 for a processing procedure. As moved to the ON position, the toggle switch 18A will provide power to the motor 210 and will also actuate movement of the clutch assembly 230 to the engaged position with the auger shaft 82.

Figure 12:
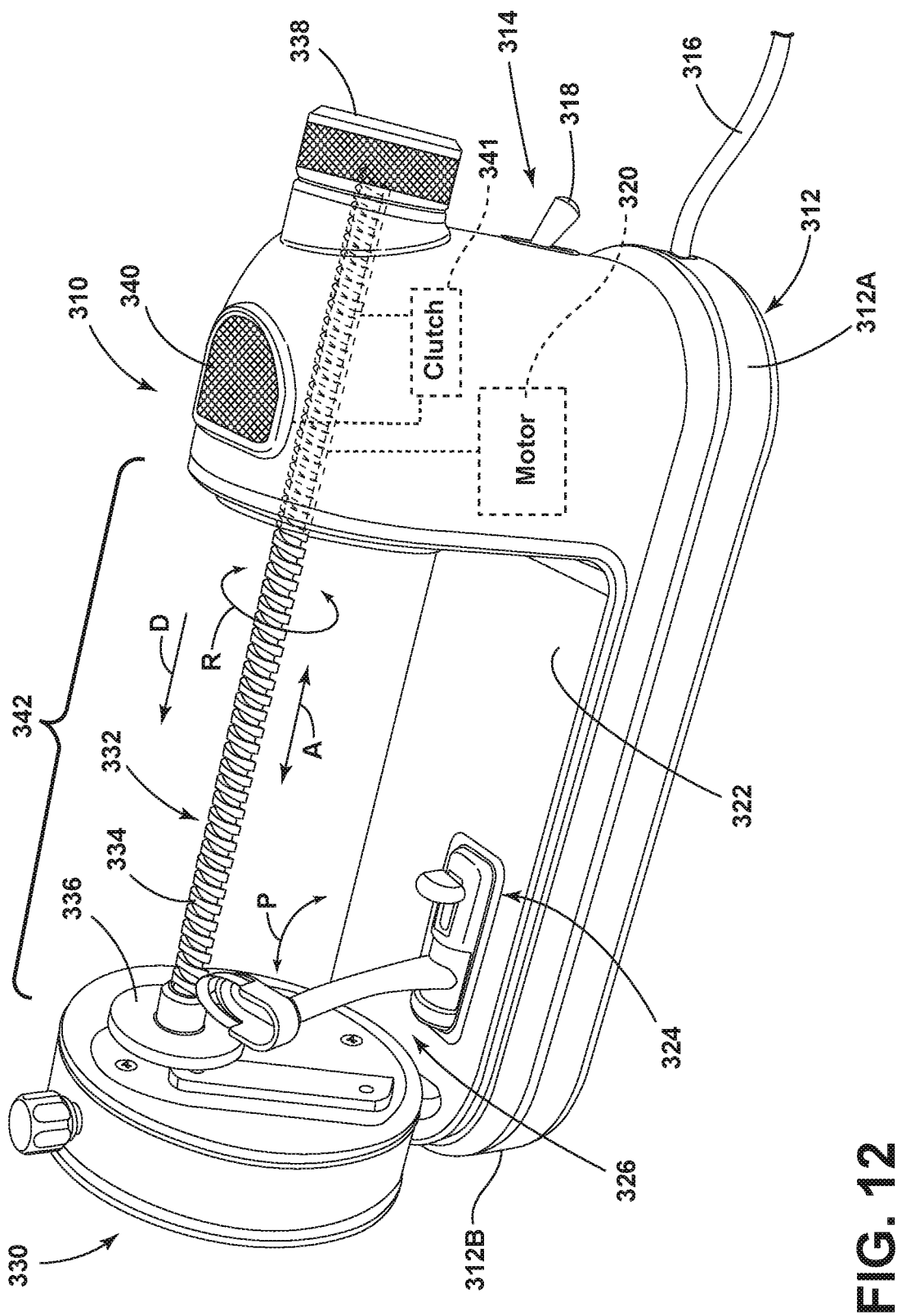
FIG. 12 is a top perspective view of a food processing device according to another embodiment.

Referring now to FIG. 12, the reference numeral 310 generally designates a food processing device according to another embodiment of the present concept. The food processing device 310 includes several features that are similar to the food processing device 10 discussed above. For example, the food processing device 310 includes a base portion 312 and a motor housing 314 upwardly extending from a first end 312A of the base portion 312. A motor 320, similar to motor 210 discussed above, is configured to power the food processing device 310. A power cord 316 extends outwardly from the base portion 312 and is configured to couple to a home power supply for powering the motor 320. The food processing device 310 further includes a power switch 318 disposed on the motor housing 314 for selectively providing power to the motor 320. The base portion 312 includes an upper platform 322 having a lock mechanism 324 which is configured to lock a peeler assembly 326 in place. The peeler assembly 326 is configured to pivot along the path as indicated by arrow P for peeling a food substrate. It is contemplated that the peeler assembly 326 is biased to the upright position shown in FIG. 1 in order to establish and maintain contact along the contours of a food substrate as processed using the food processing device 310. A processing assembly 330 is disposed on a second end 312B of the base portion 312 opposite the motor housing 314. The processing assembly 330 is configured to process a food substrate as driven therethrough by the motor 320 of the food processing device 310.

With further reference to FIG. 12, a food substrate is driven towards the processing assembly 330 by an auger shaft 332 in a direction as indicated by arrow D. The auger shaft 332 includes a threaded body portion 334 which culminates in an engagement plate 336 at a first end, and an adjustment knob 338 at a second end. The auger shaft 332 is operably coupled to the motor 320 for rotation in a direction as indicated by arrow R for driving a food substrate towards and through the processing assembly 330. As further shown in FIG. 12, the motor housing 314 includes a disengagement button 340 disposed on an upper portion thereof, wherein the disengagement button 340 is configured to disengage the auger shaft 332 from a clutch assembly 341, much like clutch disengagement lever 110 discussed above. When the auger shaft 332 is disengaged from the clutch assembly 341, the auger shaft 332 can be repositioned by a user engaging the adjustment knob 338 to slide the auger shaft 332 horizontally in the direction as indicated by arrow A between extended and retracted positions. In this way, the auger shaft 332 is easily adjusted to accommodate food substrates of various sizes in a food substrate receiving area 342 or processing area. As further shown in FIG. 12, the lock mechanism 324 is pivotally supports the peeler assembly 326 on the upper platform 322 of the base portion 312. The lock mechanism 324 can be released to remove the peeler assembly 326 form the food processing device 310.

Figure 13:
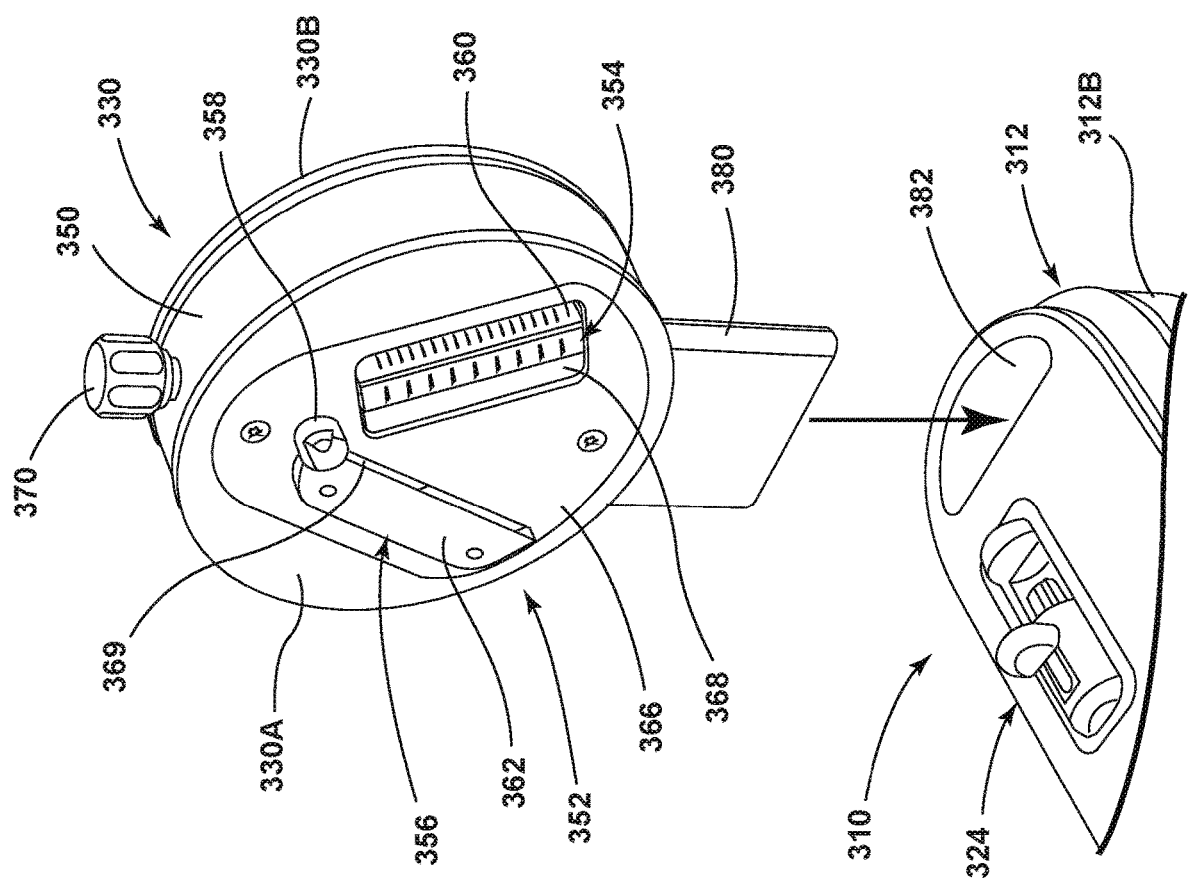
FIG. 13 is a fragmentary top perspective view of the food processing device of FIG. 12 with a processing accessory exploded away therefrom.
Figure 15:
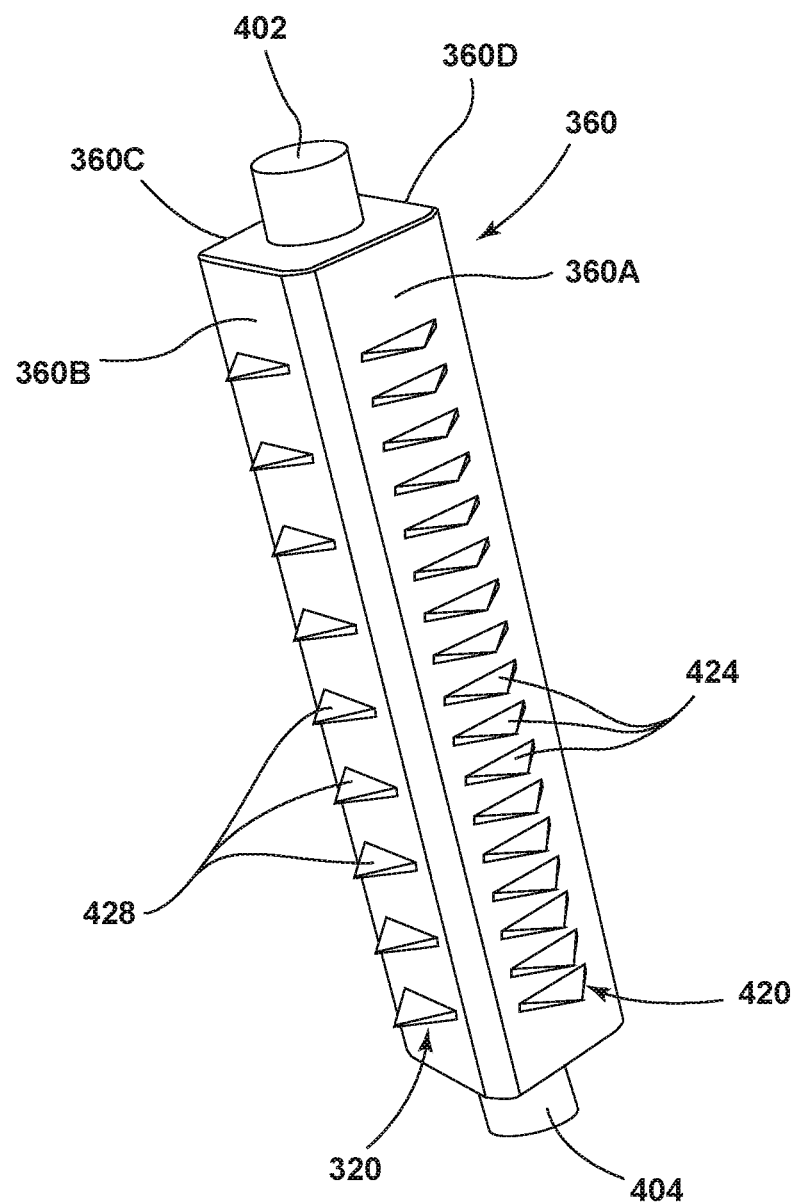
FIG. 15 is a top perspective view of a blade drum assembly.

Referring now to FIG. 13, the peeler assembly 326 has been removed from the lock mechanism 324, and the processing assembly 330 is shown exploded away from the base portion 312 of the food processing device 310. The processing assembly 330 includes first and second sides 330A, 330B and a blade housing 350. The blade housing 350 is shown in FIG. 13 as a generally circular housing with a blade configuration 352 disposed thereon. The blade configuration 352 includes first and second blade assemblies 354, 356 disposed along a rotational path of a food substrate being processed by the food processing device 310. The blade configuration 352 further includes a central coring blade 358 which is configured to couple to the second end of a food substrate for coring the food substrate as processed by the food processing device 310. The first cutting assembly 354 includes a blade drum 360 having a plurality of sides 360A-360D (FIG. 15), wherein each side 360A-360D may include varying blade configurations. The overall structure of the blade drum 360 is best shown in FIG. 15 and further described below. The second blade assembly 356 is shown as a slicing blade 362 similar to blade member 44 described above. The slicing blade 362 is outwardly extended relative to a blade carrier or base plate 366 for slicing a food substrate into sections having a thickness that is equal to the distance between the spaced-apart slicing blade 362 and the base plate 366.

The base plate 366 further includes access apertures 368, 369, wherein the blade drum 360 is disposed in access aperture 368, and the slicing blade 362 is disposed over access aperture 369. With the blade configuration 352 shown in FIG. 13, it is contemplated that a food substrate would first be cut into strips or spirals by the blade drum 360 (first cutting assembly 354) and then be cut a second time, in a manner transverse to the cutting direction of the blade drum 360, by the slicing blade 362 (the second cutting assembly 356) to provide a spiralized food substrate. The blade drum 360 is rotatable within the access aperture 368 of the base plate 366 by a drum adjustment knob 370 disposed on an upper portion of the blade housing 350. The processing assembly 330 further includes a support stem 380 which downwardly extends from a bottom portion of the blade housing 350 opposite the location of adjustment knob 370. The support stem 380 is configured to be received in a receiving aperture 382 disposed in the base portion 312 of the food processing device 310. In the embodiment shown in FIG. 13, the support stem 380 is contemplated to have a half-moon shaped configuration that is complimentary to the half-moon shaped configuration of the receiving aperture 382. Thus, the processing assembly 330 is a removable processing assembly that can be removed from the base portion 312 of the food processing device 310 for cleaning, or to provide clearance for mounting of a food substrate on the food processing device 310. The support stem 380 is configured to be closely received in the receiving aperture 382 of the base portion 312 to firmly mount the processing assembly 330 therein. It is further contemplated that a locking mechanism may be included to selectively lock and release the support stem 380 within the receiving aperture 382 of the base portion 312 of the food processing device 310.

Figure 14:
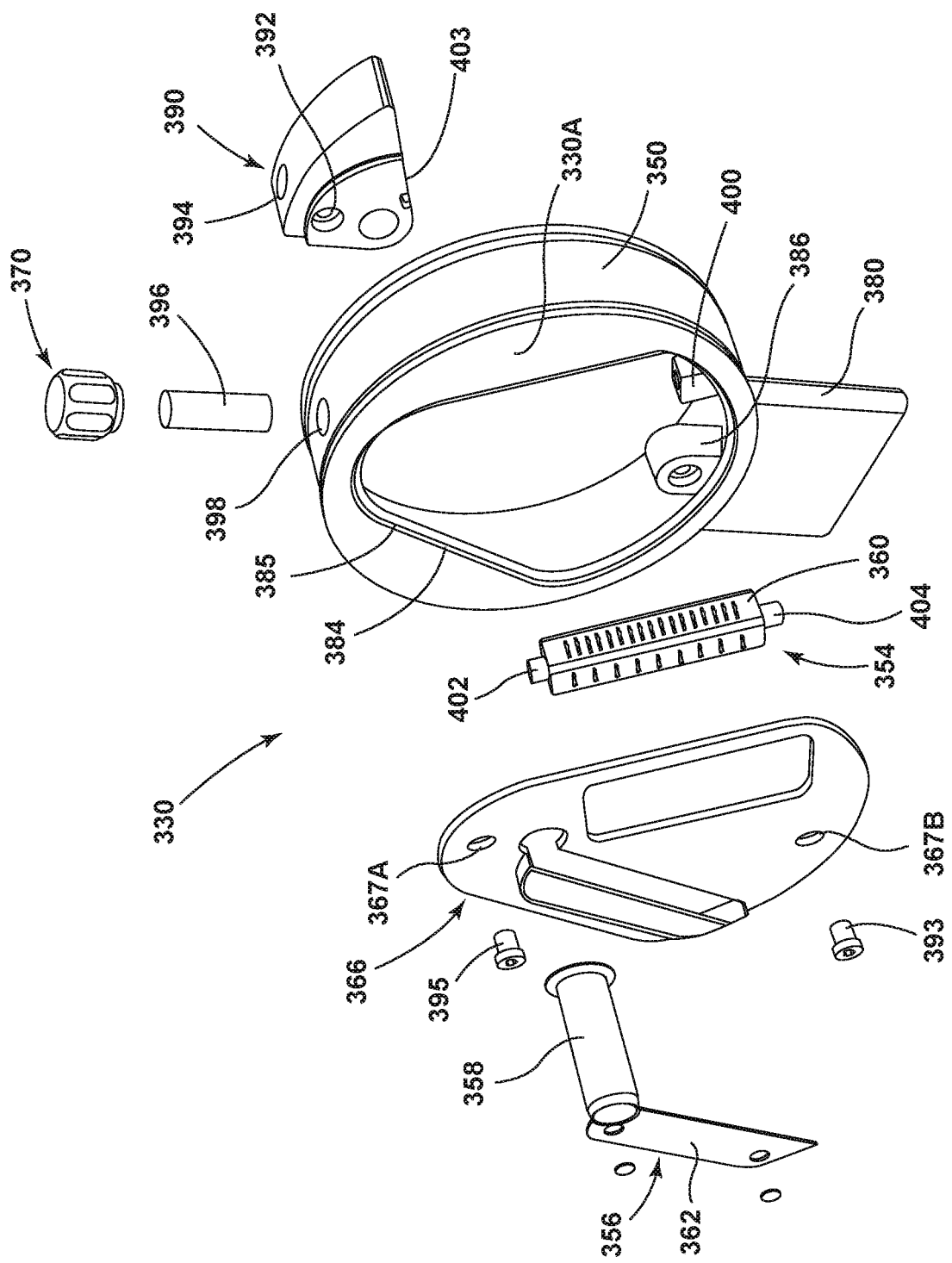
FIG. 14 is an exploded view of the processing assembly of FIG. 13.

Referring now to FIG. 14, the processing assembly 330 is shown in an exploded view with the base plate 366 exploded away from a mounting aperture 384 disposed centrally in the blade housing 350 on the first side 330A of the processing assembly. The mounting aperture 384 includes an outer rim 385 which abuts the perimeter of the base plate 366 in assembly. The blade housing 350 further includes a lower mounting boss 386 which is configured to receive a fastener 393 for mounting the base plate 366 to the blade housing 350. The blade housing 350 further includes a removable insert 390 having an upper mounting boss 392 which is configured to receive a fastener 395 for mounting the base plate 366 to the blade housing 350. Fasteners 393, 395 are configured to be received in mounting apertures 367 of the base plate 366, respectively. The insert 390 further includes an upper receiving aperture 394 which is configured to receive a rod 396 through an upper receiving aperture 398 of the blade housing 350. The rod 396 is further configured to receive the drum adjustment knob 370 for adjusting a position of the blade drum 360 in use. As further shown in FIG. 13, the blade housing 350 includes a lower pivot mounting 400 which is configured to receive a lower pivot member 404 of the blade drum 360. The blade drum 360 further includes an upper pivot member 402 which is configured to be received in a pivot mounting 403 disposed on an underside of the insert 390. With the blade drum 360 mounted at pivot mountings 400, 403, it is contemplated that the blade drum 360 is rotatable, such that any side 360A-360D (FIG. 15) may be exposed to the food substrate for processing the same. The rotation of the blade drum 360 will now be described with reference to FIG. 15.

Referring now to FIG. 15, the blade drum 360 is shown having first and second sides 360A, 360B exposed, wherein the first side 360A includes a blade configuration 420 consistent with a shredding procedure. The first side 360A includes individual blades 424 that are aligned and spaced-apart to provide a shredded food substrate having approximately 2 mm wide strips. Second side 360B of the blade drum 360 includes a blade configuration 426, wherein individual blades 428 are aligned and spaced-apart to provide a shredded food substrate having approximately 4 mm wide strips. Much like first and second sides 360A, 360B, it is contemplated that a third side 360C of the blade drum 360 includes a blade configuration having individual blades that are aligned and spaced-apart to provide a shredded food substrate having approximately 6 mm wide strips. The fourth side 360D of the blade drum 360 is contemplated to be a planar side having no blades disposed thereon. The blade drum 360 is configured with the various blades 424, 428, such that the blades extend outwardly from a plane defined by the base plate 366 to process a food substrate as rotated by the auger shaft 332. A user can rotate the blade drum 360 to have the fourth side 360D facing outwardly from the first side 330A of the processing assembly 330 to provide a broad spiral cut food substrate. Thus, with the fourth side 360D presented in the blade configuration 352, the blade drum 360 does not function to shred the food substrate before the food substrate is sliced. In such a configuration, the food substrate is still sliced by the slicing blade 362 of the second blade assembly 356 having a width equal to the length of the slicing blade (about 10-15 mm). Thus, the food processing device 310 is contemplated to provide a processed food substrate in a spiralized form having various configurations as shown in Table 1 below. Table 1 is an exemplary Table showing various configurations contemplated for a food substrate processed in the food processing device 310 of the present concept. Table 1 is not meant to limit the scope of the concept in any manner. The width identified in Table 1 is consistent with the blade configurations of the sides 360A-360D of the blade drum 360. The thickness identified in Table 1 is consistent with the blade 362 having two settings (approximately 2 mm and approximately 4 mm). It is contemplated that the blade assembly 362 may be adjustable, or fixed in various settings on different blade carriers. Other settings than the exemplary settings noted in Table 1 are also contemplated.

TABLE 1

| Drum Side | Width (mm) | Thickness (mm) | Cutting type |
| --- | --- | --- | --- |
| 160A | 2 | 2 | Spiral shred |
| 160B | 4 | 2 | Spiral shred |
| 160C | 6 | 2 | Spiral shred |
| 160A | 2 | 4 | Spiral shred |
| 160B | 4 | 4 | Spiral shred |
| 160C | 6 | 4 | Spiral shred |
| 160D | 10-15 | 2 | Spiral Ribbon |
| 160D | 10-15 | 4 | Spiral Ribbon |

Figure 16:
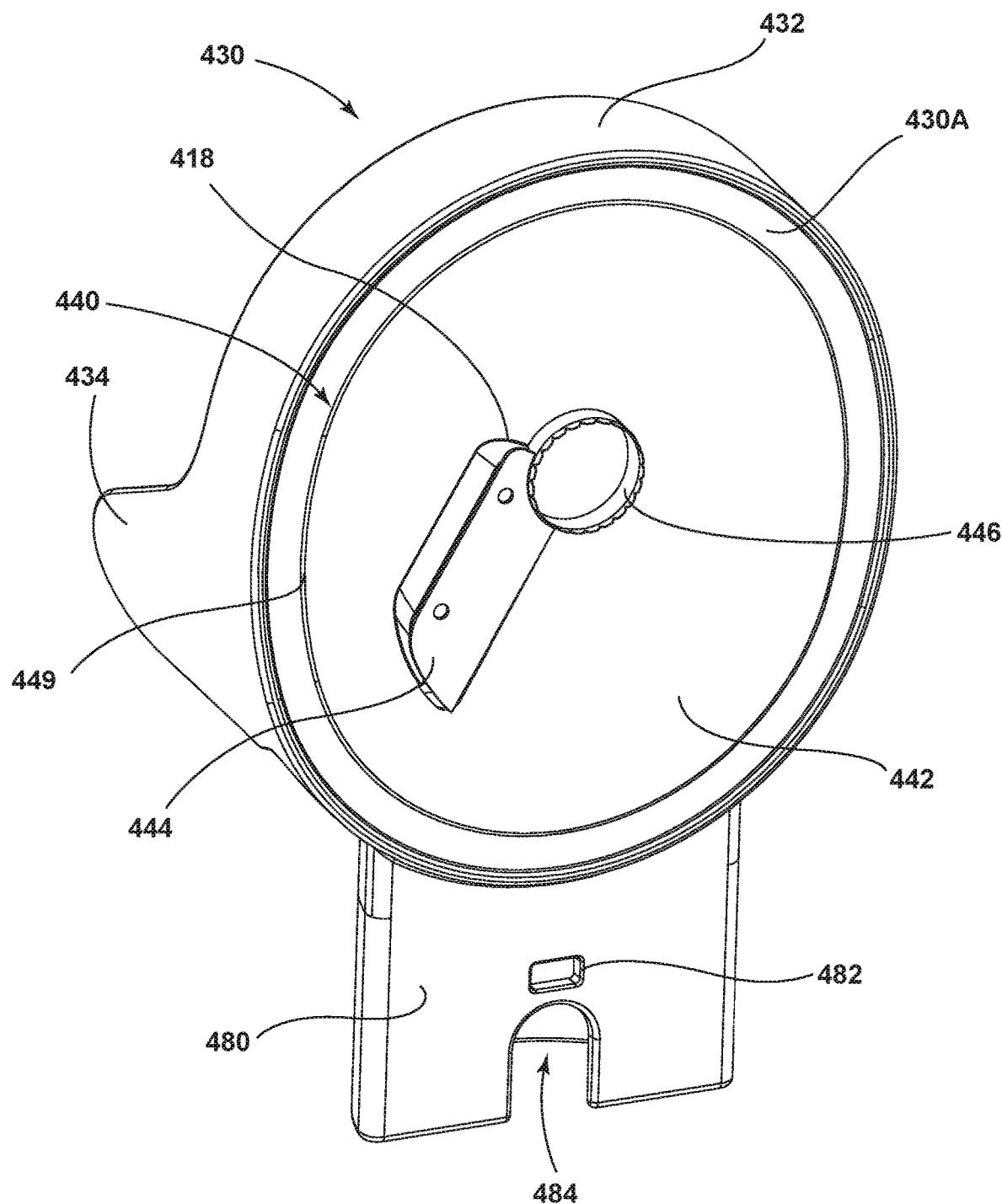
FIG. 16 is a top perspective view of another embodiment of a processing assembly.

Referring now to FIG. 16, another embodiment of a processing assembly 430 is shown having a housing 432 with a chute portion 434. The processing assembly 430 includes a front side 430A having a blade carrier 440 disposed within an inset receiving aperture 449. The blade carrier 440 includes a platform 442 from which a blade member 444 outwardly extends. The blade member 444 is disposed over an access aperture 418 disposed through the platform 442. The processing assembly 430 further includes a base portion 480 that is similar to base portion 180 of processing assembly 30 described above. The base portion 480 includes an engagement aperture 482 and cavity 484 for attaching the processing assembly 430 to the drip tray assembly 24. The processing assembly 430 further includes a centrally disposed coring blade 446 which is a larger coring blade as compared to coring blade 46 shown in FIG. 8. The larger coring blade 446 is contemplated to core food substrates having a larger core portion, such as apples and pears. As further shown in FIG. 16, the blade carrier 440 does not include a receiving aperture for receiving a processing accessory, such as processing accessories 50A-50D shown in FIG. 9. Instead, the platform portion 442 is a substantially planar unitary platform portion having only receiving aperture 418 disposed therethrough. In this way, the blade carrier 440 includes a blade configuration configured to spiralizer, slice and core a food substrate as processed therethrough.

Figure 17A:
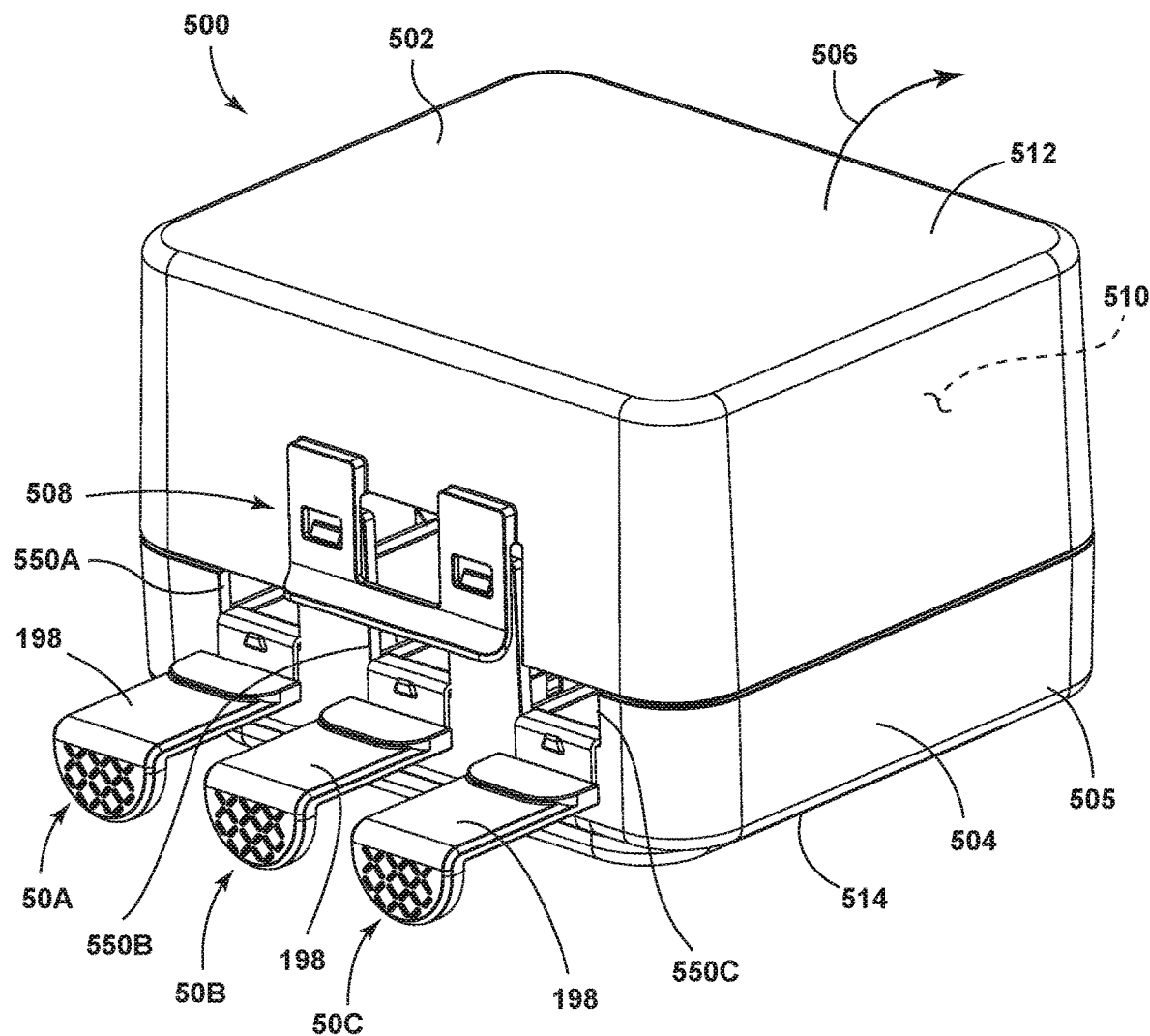
FIG. 17A is a top perspective view of a storage container storing multiple processing accessories.

Referring now to FIG. 17A, a storage container 500 is shown having a cover 502 operably coupled to a base portion 504. The base portion 504 includes a lower portion 505.

The cover 502 is configured to open in a direction as indicated by arrow 506 when a latch mechanism 508 is opened. Together, the cover 502 and base portion 504 define a cavity 510 for housing accessories for the food processing device 10 described above. In the embodiment shown in FIG. 17A, processing accessories 50A, 50B and 50C are shown having handle portions 198 thereof extending outwardly from slots 550A, 550B and 550C, respectively. Thus, the storage container 500 is configured to store the processing accessories 50A-50D (FIG. 9) within the storage cavity 510 thereof when they are not in use. The storage container 500 includes an upper surface 512 and a lower surface 514 that are used to store the storage container 500 within the processing area 20 of the food processing device 10 as shown in FIG. 18.

Figure 17B:
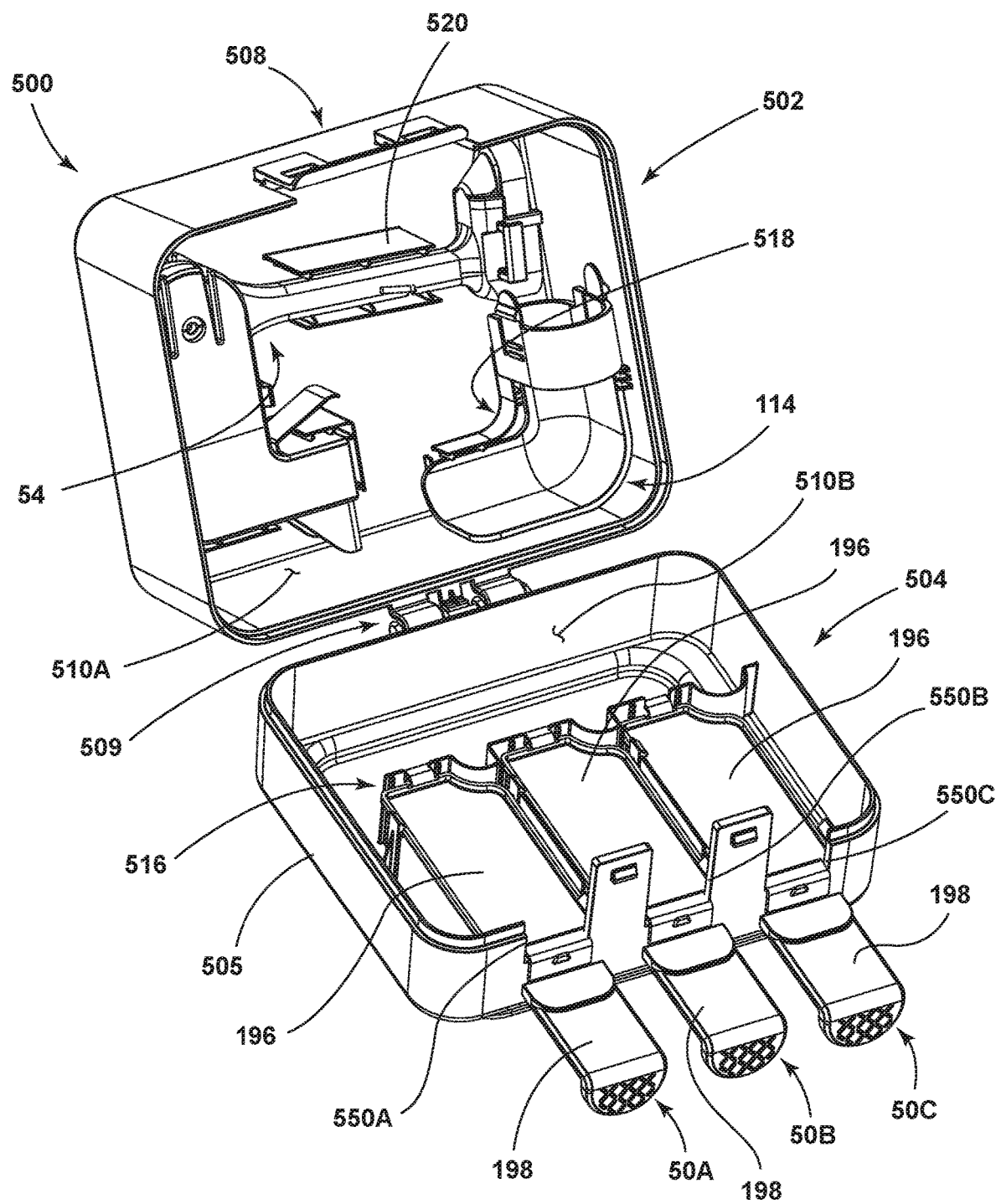
FIG. 17B is a top perspective view of the storage container of FIG. 17A in an open position with a peeler assembly and multiple processing accessories stored within.

Referring now to FIG. 17B, the storage container 500 is shown in an open position, wherein the clip mechanism 508 has been released from the base portion 504 and a hinge assembly 509 is shown disposed between the cover 502 and the base portion 504. The cavity 510 of the storage container 500 is shown having first and second portions 510A and 510B associated with the cover 502 and the base portion 504, respectively. The base portion 504 further includes engagement features 516 that are used to couple to the platform portions 196 of the processing accessories 50A, 50B, and 50C to hold and retain the same within the second portion 510B of the cavity 510. The cover 502 further includes engagement features 518 and 520 for engaging and retaining the guard assembly 114 and the peeler assembly 54, respectively.

Figure 18:
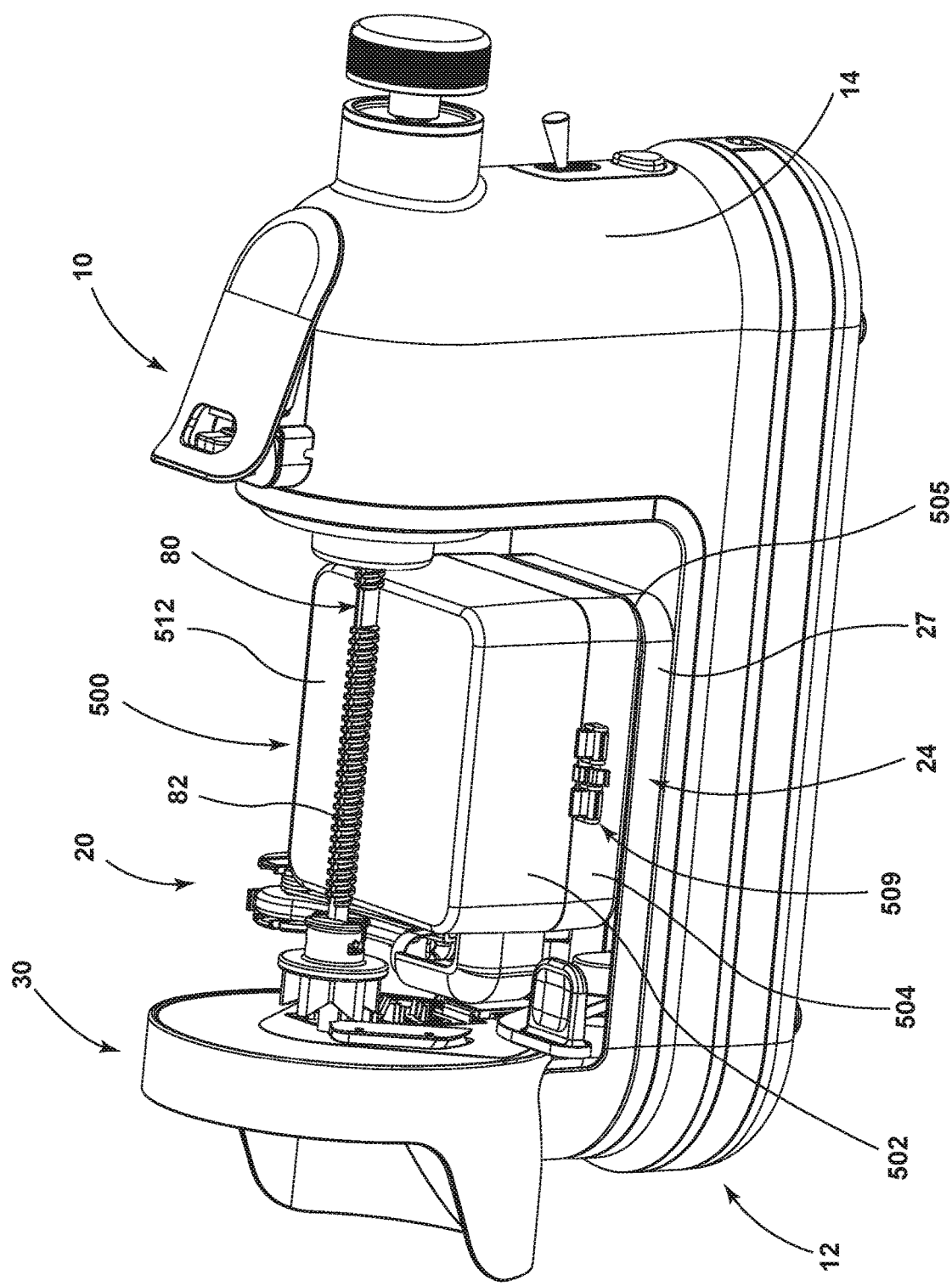
FIG. 18 is a top perspective view of the food processing device of FIG. 1A with the storage container of FIG. 17A positioned in the processing area.

Referring now to FIG. 18, the storage container 500 is shown positioned on the drip tray assembly 24 and retained therein by a rim portion 27 thereof. Specifically, the storage container 500 is positioned in the processing area 20 of the food processing device 10. The lower portion 505 of the base portion 504 is generally retained by the rim portion 27 of the drip tray assembly 24. The upper surface 512 is shown contained by the auger shaft 82 of the auger assembly 80, such that the storage container 500 is positively retained within the processing area 20 defined between the motor housing 14 and the processing assembly 30 of the food processing device 10.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A food processing device, comprising:
a base portion having first and second ends;
a motor housing upwardly extending from the first end of the base portion;
a motor disposed in the motor housing;
a processing assembly upwardly extending from the second end of the base portion and spaced-apart from the motor housing to define a processing area therebetween, wherein the processing assembly includes a blade carrier having a blade configuration;
an auger assembly having an auger shaft that is operably coupled to the motor for driving rotational movement thereof;
a clutch assembly disposed in the motor housing, wherein the clutch assembly is operable between engaged and disengaged positions with the auger assembly; and
a disconnect feature disposed on the motor housing and configured to selectively actuate movement of the clutch assembly between the engaged and disengaged positions with the auger assembly.

2. The food processing device of claim 1, wherein the auger shaft is configured to move laterally within the processing area between extended and retracted positions when the clutch assembly is in the disengaged position.

3. The food processing device of claim 2, wherein the disconnect feature includes a clutch disengagement lever operable between pressed and released positions, wherein the clutch assembly is moved to the disengaged position when the clutch disengagement lever is in the pressed position.

4. The food processing device of claim 3, including:
a locking member configured to lock the clutch disengagement lever in the pressed position.

5. The food processing device of claim 4, including:
a switch assembly configured to selectively provide power to the motor, wherein the switch assembly is moved to an OFF position when the clutch disengagement lever is in the pressed position.

6. The food processing device of claim 1, including:
a drip tray assembly removeably mounted to the base portion within the processing area.

7. The food processing device of claim 6, including:
a peeler assembly removeably mounted to the drip tray assembly.

8. The food processing device of claim 6, wherein the drip tray assembly includes a support member configured to support the processing assembly from a base portion of the processing assembly.

9. The food processing device of claim 8, including:
a release lever pivotally mounted to the drip tray assembly and operable between at rest and pressed positions, wherein the release lever releases the base portion of the processing assembly from the support member in the pressed position.

10. A food processing device, comprising:
a base portion;
a motor housing upwardly extending from the base portion;
a processing assembly removeably mounted to the base portion and spaced-apart from the motor housing to define a processing area therebetween;
an auger assembly operably coupled to a motor within the motor housing;
a clutch assembly operable between engaged and disengaged positions with the auger assembly within the motor housing; and
a clutch disengagement lever operably coupled to the clutch assembly for selectively actuating movement of the clutch assembly between the engaged and disengaged positions.

11. The food processing device of claim 10, wherein the auger assembly includes an auger shaft having a threaded body portion.

12. The food processing device of claim 11, wherein the auger shaft includes a groove disposed along a length thereof.

13. The food processing device of claim 12, including:
a drive shaft extending outwardly from the motor;
a first beveled gear coupled to the drive shaft; and
a second beveled gear gearingly engaged with the first beveled gear, wherein the second beveled gear includes an engagement portion operably coupled to the auger shaft at the groove thereof.

14. The food processing device of claim 11, wherein the auger shaft is free to move laterally through the motor housing when the clutch assembly is in the disengaged position.

15. The food processing device of claim 14, wherein the auger shaft includes an adjustment knob disposed on a first end thereof, and an engagement plate disposed on a second end thereof.

* * * * *